(12) United States Patent
McNamara et al.

(10) Patent No.: US 7,642,320 B2
(45) Date of Patent: Jan. 5, 2010

(54) POLYMER ADDITIVES WITH IMPROVED PERMANENCE AND SURFACE AFFINITY

(75) Inventors: John James McNamara, Putnam Valley, NY (US); Mervin Gale Wood, Mobile, AL (US); Ying Dong, Tarrytown, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 11/904,512

(22) Filed: Sep. 27, 2007

(65) Prior Publication Data
US 2008/0027182 A1  Jan. 31, 2008

Related U.S. Application Data

(63) Continuation of application No. 10/477,363, filed as application No. PCT/EP02/05195 on May 10, 2002, now abandoned.

(60) Provisional application No. 60/291,346, filed on May 17, 2001.

(51) Int. Cl.
C08J 3/00 (2006.01)
C08K 3/20 (2006.01)
C08L 75/00 (2006.01)
C08F 8/30 (2006.01)
C08F 283/04 (2006.01)

(52) U.S. Cl. .................. 525/192; 525/194; 525/424; 525/432; 528/310

(58) Field of Classification Search ............... 525/192, 525/194, 424, 432; 528/310
See application file for complete search history.

(56) References Cited

U.S. PATENT DOCUMENTS

| | | | |
|---|---|---|---|
| 3,441,953 A | 4/1969 | Dumont et al. | 117/139.5 |
| 3,669,939 A | 6/1972 | Baker et al. | 260/78 |
| 4,232,131 A | 11/1980 | Rody et al. | 525/184 |
| 5,041,516 A | 8/1991 | Fréchet et al. | 528/44 |
| 5,136,014 A | 8/1992 | Figuly | 528/272 |
| 5,217,573 A | 6/1993 | Tsai et al. | 162/5 |
| 5,240,985 A | 8/1993 | Gardiner | 524/274 |
| 5,272,196 A | 12/1993 | Gardiner | 524/252 |
| 5,281,438 A | 1/1994 | Gardiner | 427/256 |
| 5,328,951 A | 7/1994 | Gardiner | 524/287 |
| 5,418,301 A | 5/1995 | Hult et al. | 525/437 |
| 5,464,691 A | 11/1995 | Gardiner et al. | 428/336 |
| 5,663,247 A | 9/1997 | Sörensen et al. | 525/533 |
| 5,721,322 A | 2/1998 | Lu et al. | 525/404 |
| 5,777,129 A | 7/1998 | Juneau et al. | 548/455 |
| 5,919,442 A | 7/1999 | Yin et al. | 424/78.18 |
| 5,990,260 A | 11/1999 | Pettersson | 528/190 |
| 5,998,565 A | 12/1999 | De Brabander-van den Berg et al. | 528/176 |
| 6,114,489 A | 9/2000 | Vicari et al. | 528/84 |
| 6,395,867 B1 | 5/2002 | Maignan | 528/310 |
| 6,528,612 B1 * | 3/2003 | Brenner et al. | 528/271 |
| 6,583,214 B1 * | 6/2003 | Haeberle et al. | 524/589 |
| 2004/0156933 A1 * | 8/2004 | McNamara et al. | 424/DIG. 16 |

FOREIGN PATENT DOCUMENTS

| | | |
|---|---|---|
| DE | 19914896 A1 * | 10/2000 |
| FR | 2761691 | 10/1998 |
| WO | 93/21259 | 10/1993 |
| WO | 96/13558 | 5/1996 |
| WO | 96/19537 | 6/1996 |
| WO | 97/12882 | 4/1997 |
| WO | 97/19987 | 6/1997 |
| WO | 97/23538 | 7/1997 |
| WO | 97/45474 | 12/1997 |
| WO | 97/49781 | 12/1997 |
| WO | 98/44024 | 10/1998 |
| WO | 99/00439 | 1/1999 |
| WO | 99/00440 | 1/1999 |
| WO | 01/48057 | 7/2001 |
| WO | 01/74946 | 10/2001 |

OTHER PUBLICATIONS

C. Hawker et al., "Step-Growth Polymers for High Performance Materials: New Synthetic Methods", Am. Chem. Soc., (1996), pp. 186-196.
A. Hult et al., Advances in Polymer Science, vol. 143, (1999), pp. 1-34.
Schmalijohann et al., Polymeric Materials Science and Engineering, vol. 77, (1997), p. 173.
J. Salamone, Polymeric Materials Encyclopedia, vol. 5, (1996), pp. 3049-3053.
J. Roovers et al., Advances in Polymer Science, vol. 142, (1999), pp. 179-227.
D. Tomalia et al., Angew. Chem. Int. Ed. Engl., vol. 29, (1990), pp. 138-175.
E. Malmström et al., Macromolecules, (1995), vol. 28, pp. 1698-1703.
K. Wooley et al., J. Chem. Soc. Perkin Trans., vol. 1, (1991), pp. 1059-1076.
D. Bergbreiter et al., Macromolecules, (1992), vol. 25, pp. 636-643.

* cited by examiner

*Primary Examiner*—Nathan M Nutter
(74) *Attorney, Agent, or Firm*—Tyler A. Stevenson

(57) ABSTRACT

Novel stabilizers that are comprised of known polymer additive moieties chemically bound to hyperbranched and/or dendritic polymers or copolymers, and novel stabilizers comprised of known polymer additive moieties chemically bound to amphiphilic copolymers exhibit superior permanence in an organic substrate as well as high surface affinity.

1 Claim, No Drawings

POLYMER ADDITIVES WITH IMPROVED PERMANENCE AND SURFACE AFFINITY

This is a continuation of application Ser. No. 10/477,363, filed Nov. 12, 2003, abandoned, which is a 371 of international app. No. PCT/EP02/05195, filed May 10, 2002, which claims benefit of U.S. provisional app. No. 60/291,346, filed May 17, 2001, which applications are incorporated by reference.

The present invention relates to novel additives that are comprised of known polymer additive moieties chemically bound to hyperbranched or dendritic polymers or copolymers. The present invention also relates to novel additives that are comprised of known polymer additive moieties chemically bound to amphiphilic copolymers. The novel additives exhibit superior permanence in organic substrates and high surface affinity and are useful in for example natural or synthetic polymers, recording media and inks.

Random hyperbranched polymers are known. Hyperbranched polymers are obtained from the random polymerization of monomers in the presence of at least one polyfunctional monomer capable of introducing branching. Such a synthetic scheme is shown by Hawker and Devonport in "Step-Growth Polymers for High-Performance Materials: New Synthetic Methods," Hedrick, J. L. and Labadie, J. W., Eds., Am. Chem. Soc., Washington, D.C., 1996, pp. 191-193. Hult, et al., in "Advances in Polymer Science," Vol. 143 (1999), Roovers, J., Ed., Springer, N.Y., pp. 1-34, present a review of hyperbranched polymers.

U.S. Pat. No. 3,441,953 teaches that discrete esters of certain hindered dihydroxycarboxylic acids possess desirable properties and which may be used as textile softeners, lubricants, wetting and rewetting agents and textile assistants and which impart properties such as improved softness, scorch resistance, wettability and rewettability, static control, lubricity, tensile and tear strengths and sewability to textile materials. An example is given where polyethylene glycol (PEG) is reacted with dimethylolpropionic acid (2,2-bis(hydroxymethyl)propionic acid or BMPA) to form a PEG monoester of BMPA. This diol-ester is subsequently reacted with a tallow fatty acid to form the tallow fatty acid diester. In fact, it is believed that in the first step that a discrete PEG-BMPA monoester is not formed but that some hyperbranching must have occurred, resulting in a hyperbranched polyester.

Functionalization or end-capping of hyperbranched polymers with various groups is known.

WO 97/23538 and U.S. Pat. No. 5,990,260 disclose highly branched epoxide functional and alkenyl functional polyesters respectively. The polyester is prepared by self-condensing a di, tri, or polyhydroxy functional monocarboxylic acid monomer and which polyester contains at least one carboxyl group and multi hydroxyl groups. The polyester is reacted with an epoxide containing compound such as epichlorohydrin or a compound containing an oxidizable unsaturation to introduce the epoxide functionality. Likewise, it is reacted with a compound containing allylic or acrylic groups to introduce the alkenyl functionality.

U.S. Pat. No. 3,669,939 discloses highly branched self-condensates of polyhydroxymonocarboxylic acids, for example dimethylolpropionic acid. Monocarboxylic acids may be present in the condensation reaction. The resulting resins are useful in coating compositions.

U.S. Pat. No. 5,136,014 discloses hyperbranched polyester polymers and copolymers that may be chemically capped, crosslinked, or copolymerized with diols or dicarboxylic acids. Suitable capping agents include anhydrides, acyl chlorides, isocyanates and benzylisothiocyanate.

Schmaljohann, et al., Polymeric Materials Science and Engineering, 77 (1997), p. 173, discloses that hyperbranched aromatic polyesters and a hyperbranched polyester based on self-condensation of 2,2-bis(hydroxymethyl)propionic acid may be functionalized with alkyl acid chlorides of 2 to 18 carbon atoms, resulting in hyperbranched polyesters with an amphiphilic character.

Highly branched dendritic polymers are well known, as discussed for example in "Polymeric Materials Encyclopedia," Vol. 5 (1996), J. C. Salamone, Ed., CRC Press, New York, pp. 3049-3053. Dendritic polymers have a non-linear architecture and are intrinsically globular in shape. Discrete, stepwise synthetic methods are used to prepare highly branched pure compounds, or dendrimers. As discussed by Hawker and Devonport in "Step-Growth Polymers for High-Performance Materials: New Synthetic Methods," Hedrick, J. L. and Labadie, J. W., Eds., Am. Chem. Soc., Washington, D.C., 1996, pp. 186-196, if the macromolecule has highly regular branching which follows a strict geometric pattern, it is a dendrimer. Dendrimers are typically monodisperse and are prepared in a multi-step approach with purifications at each stage.

The architecture of dendrimers is also discussed by Roovers and Comanita in "Advances in Polymer Science," Vol. 142 (1999), Roovers, J., Ed., Springer, New York, pp. 179-228. Dendrimers consist of a core molecule which defines the center of symmetry of the molecule, and branching layers. Tomalia, et al., in *Angew. Chem. Int. Ed. Eng.*, 29 (1990), 138-175 disclose "starburst" dendrimers which consist of an initiator core and branching groups.

Hyperbranched macromolecules result if the branching is random and irregular and are therefore not monodisperse. There are significant amounts of failure sequences present in such hyperbranched macromolecules. As discussed by Malmstroem, et al., in *Macromolecules*, 28 (1995), 1698-1703, a hyperbranched material contains a mixture of linear and fully branched $AB_x$ repeating units and has a degree of branching of less than unity. An ideal dendritic substance has a degree of branching of unity.

It is taught in WO 99/00439 and WO 99/00440 that dendrimers are highly symmetric, while similar macromolecules designated as hyperbranched and/or dendritic may to a certain degree hold an asymmetry, yet maintaining the highly branched tree-like structure.

U.S. Pat. No. 5,418,301 teaches polyester-based dendritic macromolecules and their use as an alternative to conventional polyester alkyd resins. The dendritic macromolecules are built from a symmetric central initiator molecule or initiator polymer and a monomeric chain extender having one carboxyl and two hydroxyl groups and is optionally capped with a chain stopper. The macromolecules described therein are prepared in a stepwise fashion. The exemplified central initiator molecules are ditrimethylolpropane, trimethylolpropane and ethoxylated pentaerythritol. It is taught that the central initiator compound may be an alkoxylate polymer such as polyethylene glycol or polypropylene glycol as well as polytetrahydrofuran.

U.S. Pat. No. 5,663,247 discloses dendritic or near dendritic hyperbranched polyester-based macromolecules that comprise a central nucleus, a monomeric or polymeric chain extender with at least three reactive sites and optionally a chain stopper. The central nucleus is an epoxide compound with at least one reactive epoxide group. The chain extender has at least one hydroxyl group and at least carboxyl or epoxy group. The chain extender may be for example dimethylolpropionic acid. The examples given employ a stepwise preparation and employ as the nucleus a bisphenol A-diglycidyl ether and triglycidyl isocyanurate.

WO 96/13558 discloses a binder composition comprised of at least one unsaturated monomer and at least one unsaturated polyester. The unsaturated polyester is a dendritic or hyperbranched macromolecule comprising a nucleus, a chain extender, and a chain stopper. The nucleus has at least one reactive hydroxyl or epoxide group. The chain extender has at least two reactive hydroxyl groups and at least one reactive carboxyl group. The unsaturation in the polyester is introduced through the chain stopper. Stepwise methods are disclosed for the preparation of the polyesters. The exemplified polyesters are prepared from a nucleus of ethoxylated pentaerythritol.

WO 96/19537 discloses thermosetting materials such as composites with increased toughness with the incorporation of functionalized polyester dendritic or hyperbranched macromolecules in the thermosetting resin. The polyester macromolecules contain at least one primary or secondary reactive site. The macromolecules are built from a nucleus having at least one reactive epoxide or hydroxyl group, a chain extender with at least two reactive hydroxyl groups and at least one reactive carboxyl group and a chain stopper. The reactive sites are introduced through the chain termination. The disclosed polyesters are prepared in a stepwise fashion. The exemplified polyesters are prepared from a nucleus of pentaerythritol pentaethoxylate.

WO 97/49781 discloses a refrigeration working fluid comprising a lubricant comprising at least one chain terminated dendritic or hyperbranched polyester macromolecule and a refrigerant. The polyesters are composed of a nucleus, a chain extender and a chain terminator. The nucleus is a mono, di, tri, or polyfunctional alcohol or epoxide. The chain extender is an hydroxy functional carboxylic acid and the chain terminator is a aliphatic carboxylic acid. The exemplified end-capped hyperbranched polyesters are prepared in a stepwise fashion with a nucleus of either neopentyl glycol or trimethylolpropane.

WO 97/45474 discloses thermoplastic polymers grafted with hyperbranched dendritic polyester macromolecules. The polyester macromolecules consist of a nucleus, a chain extender and an optional chain stopper. The nucleus has at least one reactive epoxide, hydroxyl, carboxyl or anhydride group. The chain extender has at least three reactive groups of which at least one is a hydroxyl group and at least one is a carboxyl or anhydride group. The optional chain stopper may be for example an aliphatic carboxylic acid. The exemplified hyperbranched dendritic polyesters are prepared according to a stepwise method with pentaerythritol pentaethoxylate as the nucleus.

WO 99/00439 discloses a process for the preparation of hyperbranched dendritic polyester alcohols. The polyester alcohols (polymeric polyalcohols or polyols) have a symmetrical or near symmetrical highly branched structure. The polymeric polyalcohols are composed of an initiator molecule with one or more reactive groups and branching chain extender molecules with three functional groups of which two are hydroxyl groups and one is a group reactive to the initiator molecule and/or hydroxyl groups. The two hydroxyl groups of the branching chain extender are acetal protected during the addition. Deprotection and subsequent addition of another generation of acetal protected chain extenders, etc., yields highly branched symmetrical dendrimers. WO 99/00440 discloses a similar process towards the preparation of the same polymeric polyalcohols. A double stage convergent synthesis is taught wherein the nucleus (initiator molecule) has one or more hydroxyl or epoxide groups. The branching chain extender molecules have three functional groups of which two are hydroxyl groups and one is a carboxyl group. The branching generations are prepared first from ketal protected chain extenders and a carboxyl protected chain extender and deprotection/subsequent reaction steps. After deprotecting the carboxyl group, the prepared branches are then coupled to the nucleus molecule. U.S. Pat. No. 5,041, 516 discloses a stepwise "convergent" process for the preparation of polyaromatic ether and polyamide dendrimers.

Linear polymer-dendrimer hybrids are known.

WO 93/21259 discloses dendritic macromolecules of specific shapes such as barbells, kites, triblocks and knot shaped molecules and a stepwise method for their preparation. Several of these specially shaped macromolecules may be prepared by stepwise methods with the incorporation of a linear polymer such as a polyalkyl ether or a polystyrene. The dendritic polymer groups with unique reactive sites are preferable prepared by the convergent growth method as disclosed in U.S. Pat. No. 5,041,516. All of the examples are performed with polyaromatic ethers which are true dendrimers prepared by a convergent method as disclosed in U.S. Pat. No. 5,041, 516, *J. Am. Chem. Soc.* 112 (1990), 7638-7647 and J. Chem. Soc. Perkin Trans. I (1991), 1059-1076. A broad range of possible uses for the specially shaped compounds is envisioned, including surface modification and compatibilization. Roovers and Comanita in "Advances in Polymer Science," Vol. 142 (1999), Roovers, J., Ed., Springer, N.Y., pp. 211-216 disclose similar hybrid macromolecules. The functional dendrimers are reacted with a linear polymer to form the hybrids.

The use of polyalkylene oxide polymers towards effecting the surface properties of a polymer is known.

Bergbreiter and Srinivas in *Macromolecules* 25 (1992), 636-643, disclose an "entrapment functionalization" approach towards modifying the surface of high-density polyethylene. Block cooligomers of polyethylene and poly (ethylene glycol) are prepared and intimately mixed with virgin polyethylene. Analysis of polymer films prepared from this mixture showed that the poly(ethylene glycol) units ended up primarily at the outermost layers of the film.

U.S. Pat. No. 5,217,573 teaches a method for removing laser printer and xerographic toner, ink or the like from paper by alkaline washing and flotation in the presence of a surfactant which has two lipophilic groups and one hydrophilic group. The lipophilic groups are derived from rosin acids and the hydrophilic group is derived from polyethylene glycol.

U.S. Pat. No. 5,464,691 discloses the use of an amphiphilic resin towards modifying the surface energy of a polyolefin. The amphiphilic resins are composed of hydrocarbon sections and a polar section. The hydrocarbon sections are derived from, for example, long-chain aliphatic carboxylic acids and the polar section is derived from a telechelic diol, for example polyethylene glycol.

U.S. Pat. No. 5,721,322 discloses a method for increasing the surface activity of non-polar polymeric materials, in particular polyolefins and polystyrenes, with the incorporation of a triblock copolymer. The triblock copolymer has two sections compatible with the host polymer, for example long-chain aliphatic groups. The center section is derived from a polyepichlorohydrin telomer.

U.S. Pat. Nos. 5,240,985, 5,272,196, 5,281,438, 5,328,951 disclose the use of an amphiphile towards increasing the surface energy of polyolefins. The amphiphile consists of a central hydrophilic component and two lipophilic components. The hydrophilic component is derived from, for example, polyglycols and the lipophilic components are derived from, for example fatty acids.

WO 97/12882 discloses polymeric benzotriazoles including the reaction product of the self-condensation product of 3,5-dihydroxybenzoic acid and 4-hydroxyphenylmethyl carbinol benzotriazole. U.S. Pat. No. 6,114,489 discusses hyperbranched polymers with functional moieties. WO 98/44024 discusses the use of certain hyperbranched polymers as antioxidants.

U.S. Pat. No. 5,777,129 discloses hyperbranched polymers. WO 01/74946 discloses dendrimer additives.

Polymer additives are known to those skilled in the art. They are for example antioxidants such as hindered phenolic antioxidants, ultraviolet light absorbers (UVA's) such as hydroxyphenylbenzotriazoles, hydroxyphenyltriazines and hydroxybenzophenones, hindered amine light stabilizers (HALS), hydroxylamine stabilizers, amine oxide stabilizers, benzofuranone stabilizers and organic phosphorus stabilizers.

A subject of the present invention are polymer stabilizers with improved permanence and/or surface affinity by virtue of being chemically bound to hyperbranched or dendritic polymers or copolymers. Another subject of the present invention are polymer stabilizers with improved permanence and/or surface affinity by virtue of being chemically bound to amphiphilic copolymers. Compounds containing known polymer additive moieties and appropriate reactive sites are bound to hyperbranched or dendritic polymers or copolymers or to amphiphilic copolymers through condensation or other chemical reactions.

A further subject of the present invention is a process for preparing the novel plastic additives herein disclosed.

A further subject of the present invention are stabilized compositions subject to degradation by the deleterious effects of heat, light or oxidation, which compositions comprise an effective stabilizing amount of the novel polymeric stabilizers herein disclosed.

Disclosed are permanent and/or surface-active hyperbranched or dendritic polymer stabilizers comprised of at least one polymer additive moiety and at least one hyperbranched or dendritic polymer moiety.

Also disclosed are permanent and/or surface active amphiphilic polymer stabilizers comprised of at least one polymer additive moiety and at least one amphiphilic copolymer moiety.

Specifically, the present invention discloses novel hyperbranched or dendritic stabilizers of the formula (I)

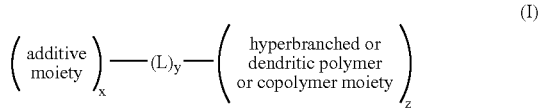

(I)

where x and y are each independently greater than or equal to 1, z is 1 to 5,

L is independently of each other a direct bond or a chemical linking group, with the proviso that the reaction product of the self-condensation product of 3,5-dihydroxybenzoic acid and 4-hydroxyphenylmethyl carbinol benzotriazole is excluded.

The present invention also discloses novel amphiphilic stabilizers of the formula (II)

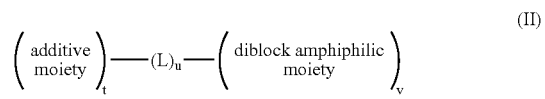

(II)

where t, u and v are independently greater than or equal to 1, and

L is independently of each other a direct bond or a chemical linking group.

The variables t, u and v are for example independently 1, 2, 3 or 4.

The additive moiety is for example independently selected from the group consisting of antioxidant, ultraviolet light absorber, hindered amine light stabilizer, hydroxylamine stabilizer, nitrone stabilizer, amine oxide stabilizer, benzofuranone stabilizer and organic phosphorus stabilizer moieties.

The terms x, y independently may be for example 1 to 200, 1 to 100, 1 to 50, for instance 1 to 25, 1 to 10 or 1 to 5.

The term z is for example 1, 2, 3 or 4. Particularly, z is 1 or 2.

For the purposes of this invention, and as is understood in the art, the term "moiety" means a chemical functional group when it is part of a larger compound, for example when part of a compound of formula (I). For example, the term "hyperbranched or dendritic polymer or copolymer moiety" refers to the hyperbranched or dendritic portion(s) of formula (I). Likewise the term "additive moiety" refers to the portion of formula (I) with polymer additive functionality. Polymer additive functionality means for example antioxidant, ultraviolet light absorber, light stabilizer, process stabilizer, etc., functionality.

The chemical linking group L may for example be any divalent linking group. Linking groups are for example esters, amides, and other common divalent groups, for example —OCO—, —COO—, —O—, —CONH—, —CONR—, —NHCO—, —NRCO—, —CO—, —NH—, —NR—, —S—, —SO—, SO$_2$—, —CSO—, —COS—, —CSS—, where R is a hydrocarbyl group. Of special interest is the linking group L —OCO— or —COO— or is a hydrocarbylene comprising the groups —OCO— or —COO—.

Linking groups L may also be a divalent hydrocarbylene group that comprises one of the above ester, amide, etc., groups.

The term "hydrocarbyl group" broadly refers to a monovalent hydrocarbon group in which the valency is derived by abstraction of a hydrogen from a carbon atom. Hydrocarbyl includes for example aliphatics (straight and branched chain), cycloaliphatics, aromatics and mixed groups such as aralkyl, alkylaryl, alkynyl, cycloalkynyl. Hydrocarbyl includes such groups as alkyl, cycloalkyl, aryl, aralkyl, alkylaryl, alkenyl, and cycloalkenyl. A hydrocarbyl may optionally be interrupted by carbonyl, carboxyl, amino, amido, thio, sulfoxide, sulfonyl and ether groups and/or may optionally be substituted by hydroxy, amino, amido, carboxyl and thio groups.

The term "hydrocarbylene" broadly refers to any divalent hydrocarbon in which both valencies derive by abstraction of hydrogens from carbon atoms. Included within the definition of hydrocarbylene are the same groups as indicated herein for hydrocarbyl, with of course, the extra valency, for example alkylene, alkenylene, arylene, alkylaryl, etc.

A hydrocarbylene as defined herein may also be any polymeric or oligomeric backbone (non-hyperbranched and non-dendritic) known in the art as part of polymeric or oligomeric polymer additives. For example triazine-containing polymeric backbones that are part of commercial hindered amine compounds, for example Chimassorb® 944.

The instant invention relates also to a process for the preparation of a compound of formula (I)

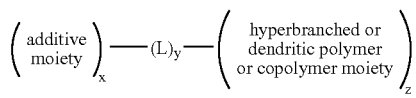    (I)

which comprises reacting an additive compound of formula (a)

    (a)

with a fully formed hyperbranched or dendritic polymer or copolymer, with a partially formed hyperbranched or dendritic polymer or copolymer, or with components of a hyperbranched or dendritic polymer or copolymer, where x and y are each independently greater than or equal to 1, z is 1 to 5, and L is independently of each other a direct bond or a chemical linking group, p and q are independently greater than or equal to 1, and G is independently a reactive functional group (RFG) or a hydrocarbylene comprising at least one reactive functional group.

The polymer additive compounds of formula (a) contain additive functional moieties selected for example from the group consisting of antioxidant, ultraviolet light absorber, hindered amine light stabilizer, hydroxylamine stabilizer, nitrone stabilizer, amine oxide stabilizer, benzofuranone stabilizer and organic phosphorus stabilizer moieties.

The reactive functional group (RFG) may be, for example, —OH, —NHR, —NH$_2$, —SH, —SO$_2$H, —CO$_2$H, —CO$_2$R, —COX, —CSOH, —COSH, —CS$_2$H, —NCO, epoxy, epoxy ether, epoxy ester or X, wherein X is Cl, Br or I and R is a hydrocarbyl group.

Preferably, in the stabilizers of formula (I) x is greater than one and comprising two different additive moieties.

Of interest are stabilizers of formula (I) or (II) in which the two different additive moieties are the ultraviolet light absorber and hindered amine light stabilizer moieties.

Of special interest are stabilizers of formula (I) or (II) in which the hyperbranched or dendritic moiety comprises a multi-functional monomer selected from dimethylolpropionic acid and α,α-bis(hydroxymethyl)butyric acid.

Especially preferred stabilizers of formula (I) or (II) are those in which the hyper-branched or dendritic moiety comprises a multi-functional monomer selected from dimethylolpropionic acid and α,α-bis(hydroxymethyl)butyric acid and the additive moiety is selected from the group consisting of the hydroxyphenylbenzotrizole, hydroxyphenyltriazine, hydroxybenzophenone, and hindered amine moieties.

The additive moieties are for example chemical structural groups comprising additive functional structural groups selected from the group consisting of

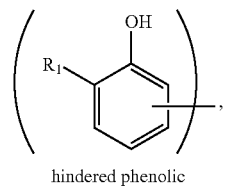

hindered phenolic

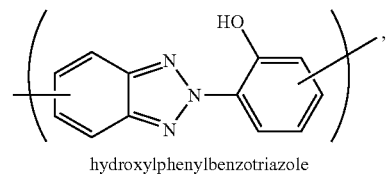

hydroxylphenylbenzotriazole

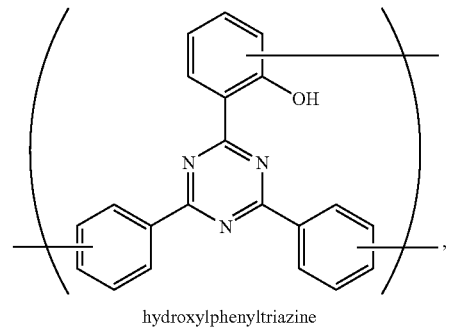

hydroxylphenyltriazine

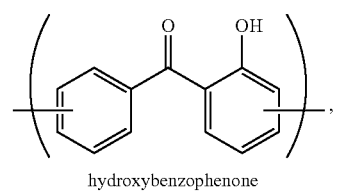

hydroxybenzophenone

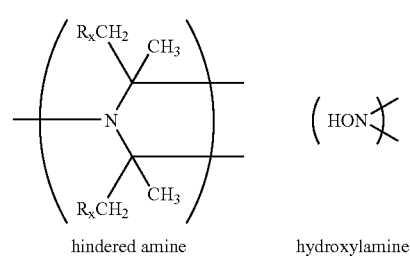

hindered amine      hydroxylamine,

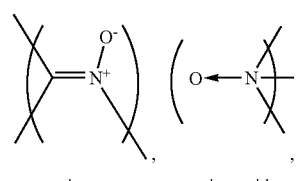

nitrone      amine oxide

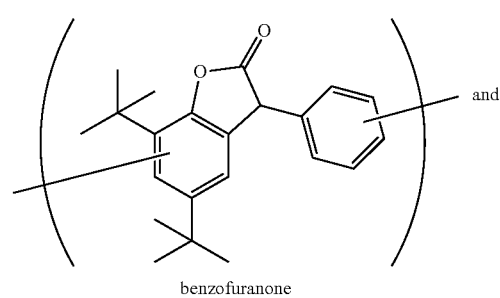

benzofuranone and

-continued

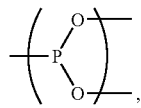
phosphites and phosphonite moieties wherein at least one of the open bonds of the moieties is bound directly to a group G, $R_1$ is a sterically bulky group, for example a group selected from the group consisting of tert-butyl, α-methylbenzyl, α,α-dimethyl-benzyl(cumyl), α-methylcyclohexyl, cyclopentyl, benzyl and tert-octyl, and $R_x$ is hydrogen or methyl.

The remaining open bonds are bound to groups known to those skilled in the art so that the additive moiety has its known additive function, for example hydrogen or a hydrocarbyl group or a hydrocarbylene group. It is possible for more than one hydrocarbylene to be bound to another to form a cyclic structure.

The reactive functional group, RFG, of the group G of the compound of formula (a) reacts with a reactive site on a hyperbranched or dendritic polymer or copolymer, a partially formed hyperbranched or dendritic polymer or copolymer, or a component thereof. The linking group L of formula (I) is formed by this reaction.

In many instances the present compounds of the formula (a) are disclosed and known to those skilled in the art of polymer stabilization. Known compounds without any reactive functional group may also be modified to have a reactive functional group; or a known compound with a reactive functional group may be modified to have a reactive functional group of a different reactive functionality. For example, a compound of formula (a) where a polymer additive moiety is attached to a group G comprising a reactive functional group such as an electrophilic ester, the ester may be reduced to be a nucleophilic alcohol.

That is, the polymer additives of formula (a) of the present invention are known in the art or are known compounds that may be modified by known methods to be of formula (a).

Of interest are stabilizers of formula (I) or (II) in which the additive moiety is selected from the group consisting of the hydroxyphenylbenzotrizole, hydroxyphenyltriazine, hydroxybenzophenone, and hindered amine moieties.

Specific examples of polymer additives of formula (a) are

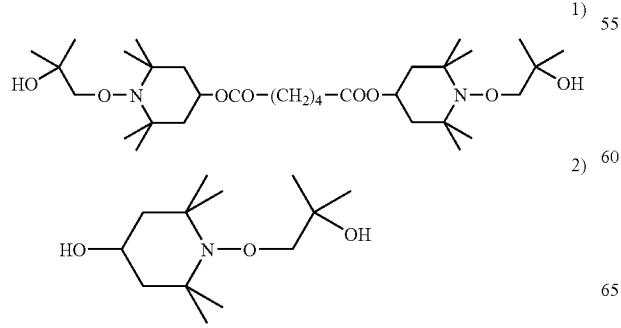

1)

2)

-continued

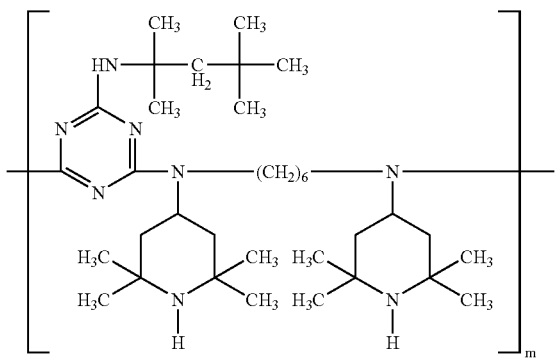

3)

Chimassorb® 944, Ciba Specialty Chemicals

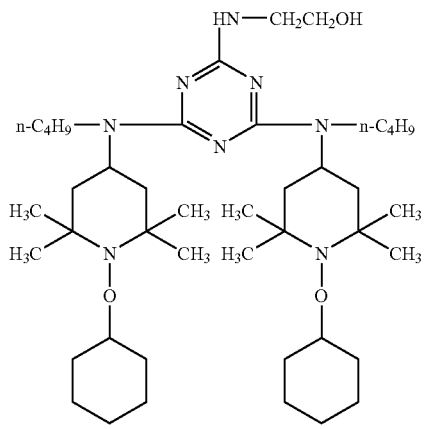

4)

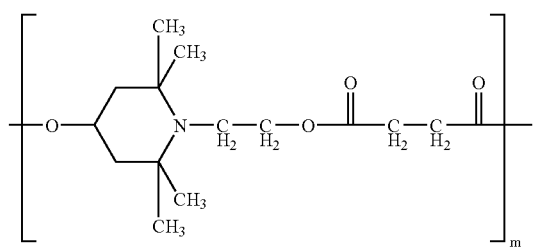

5)

Tinuvin® 622, Ciba Specialty Chemicals and other hindered amines or modifiable hindered amines,

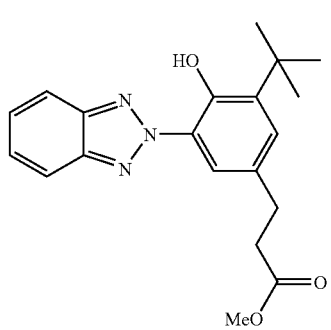

6)

-continued

7)
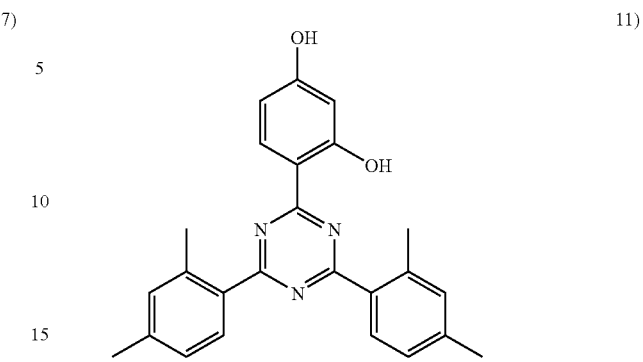

8)
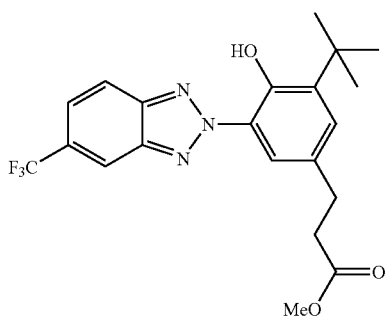

and other hydroxyphenyltriazines or modifiable triazines.

It can seen from the above structures of formulae 1)-11), that the present variables p and q may truly be independent of each other. Therefore, variables x and y in present compounds of formula (I) are also truly independent of each other.

For example, in the compound of formula 1), with a reactive hydroxyl, p is 1 and q is 2. In the compound of formula 1), the additive moiety is

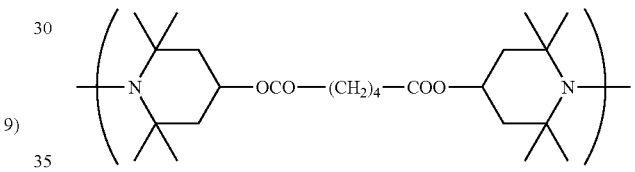

and the group G is a hydrocarbyl group comprising the reactive functional group hydroxyl:

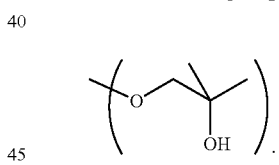

9)

In formula 2), p is 1 and q is 2. The additive moiety is

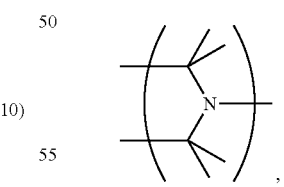

and other hydroxyphenylbenzotriazoles or modifiable hydroxyphenylbenzotriazoles, 10)
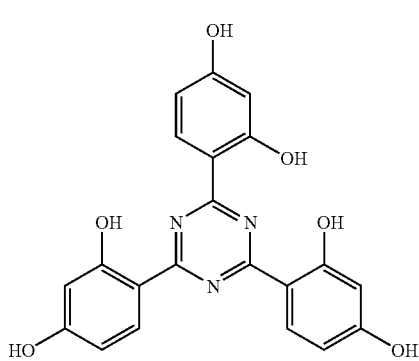

and there are two different hydrocarbyl groups G comprising reactive functional groups (hydroxyls):

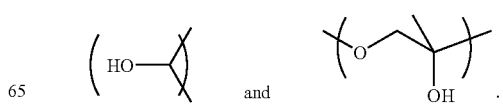

In oligomeric formula 3), with a reactive amine end group, p=2 times m, the group G may be considered the oligomeric backbone comprising the hindered amine moieties and therefore q is 1.

In tris-resorcinol triazine 10), with 1, 2, 3, 4 or 5 reactive hydroxyl groups, p is 1 and q is 5, and each G is hydroxyl. It can be seen that if a tris-resorcinol triazine of formula 10) is attached to a hyperbranched moiety 1, 2, 3, 4 or 5 times, that x and y are independent of each other in compounds of formula (I).

Of special interest are stabilizers of formula (I) or (II) in which the additive moiety is derived from one or more compounds selected from the group consisting of

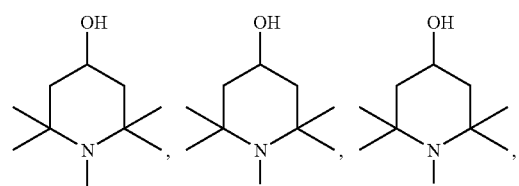

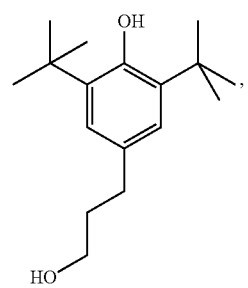

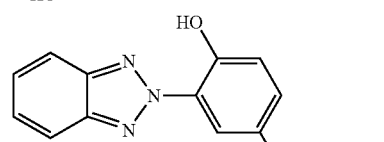

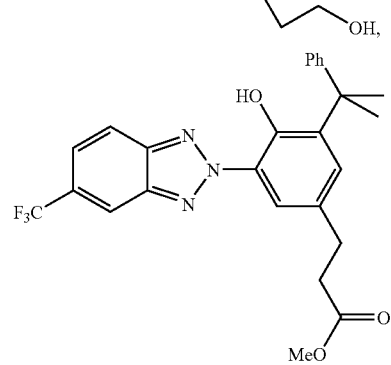

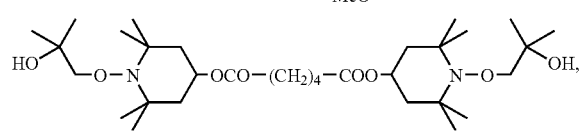

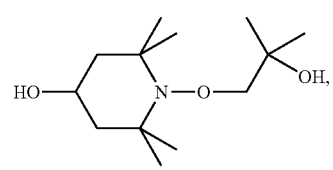

-continued

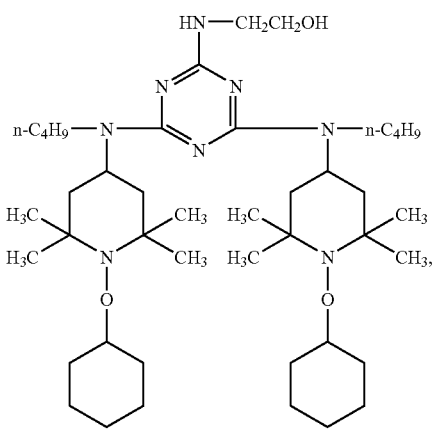

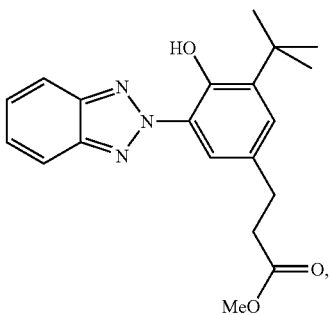

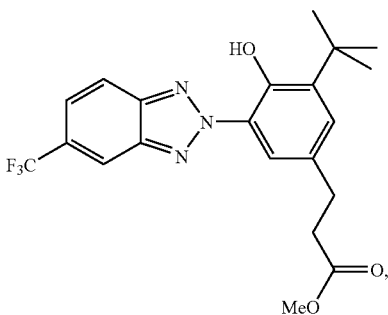

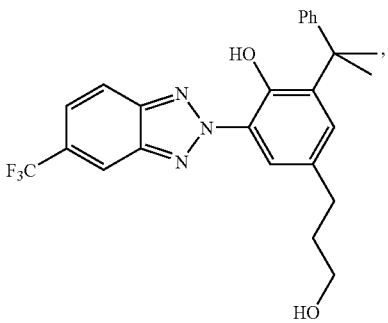

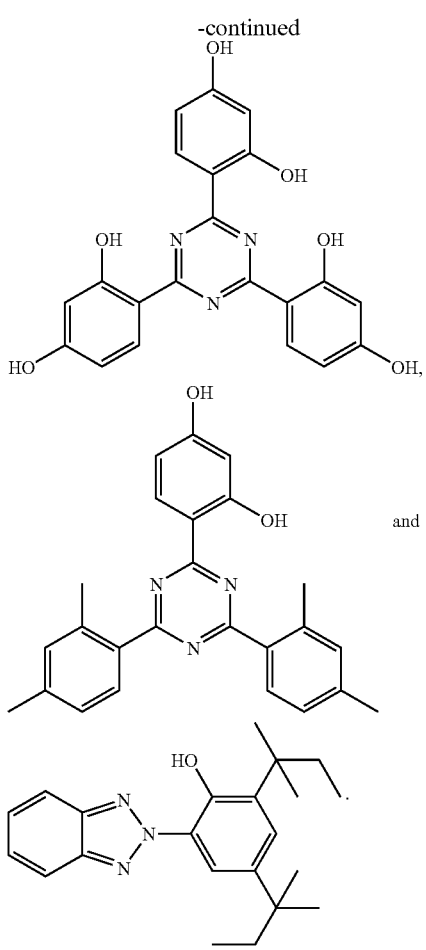

The additive functional structural groups that are substructures (a part thereof) of the polymer additive moieties of the present invention are disclosed in many U.S. patents and are known to those skilled in the art. They are the functional portions of the additives disclosed and known in the art. For example, the chromophore of a known ultraviolet light absorber (UVA) is the primary functional portion (functional structural group) of the UVA molecule.

For example, the hydroxyphenylbenzotriazole functional structural groups are disclosed for example in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, the relevant parts of which are hereby incorporated by reference.

The hydroxyphenyltriazine functional structural groups are disclosed for example in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, and U.S. application Ser. No. 09/383,163, the relevant parts of which are hereby incorporated by reference.

The hindered amine functional structural groups are disclosed for example in U.S. application Ser. Nos. 09/257,711, 09/505,529 and 09/794,710, and U.S. Pat. Nos. 5,204,473, 5,096,950, 5,004,770, 5,844,026, 6,046,304, 6,166,212, 6,117,995 and 6,221,937, the relevant parts of which are hereby incorporated by reference. The amine of the hindered amine may be substituted by groups known in the art, for example methyl, hydrogen, acyl, or alkoxy or cycloalkoxy.

Hydroxylamine functional structural groups are disclosed for example in U.S. Pat. Nos. 4,590,231, 4,668,721, 4,782,105 and 4,876,300, 4,649,221, 4,691,015, 4,703,073, 4,612,393, 4,696,964, 4,720,517 and 4,757,102, 4,831,134, 5,006,577, 5,019,285, 5,064,883, 5,185,448 and 5,235,056, 4,666,962, 4,666,963, 4,678,826, 4,753,972, 4,757,102, 4,760,179, 4,929,657, 5,057,563, 5,021,479, 5,045,583 and 5,185,448, the relevant parts of which are hereby incorporated by reference.

Amine oxide functional structural groups are disclosed for example in U.S. Pat. Nos. 5,081,300, 5,162,408, 5,844,029, 5,880,191 and 5,922,794, the relevant parts of which are hereby incorporated by reference.

Nitrone functional structural groups are disclosed for example in U.S. Pat. No. 4,898,901, the relevant parts of which are hereby incorporated by reference.

Benzofuranone functional structural groups are disclosed for example in U.S. Pat. No. 4,325,863; 4,338,244; 5,175,312; 5,216,052; 5,252,643; 5,369,159; 5,488,117; 5,356,966; 5,367,008; 5,428,162; 5,428,177; 5,614,572; 5,883,165 or 5,516,920, all incorporated herein by reference.

Phosphite and phosphonite functional structural groups are disclosed for example in co-pending U.S. application Ser. No. 09/783,256, the relevant parts of which are hereby incorporated by reference.

Hyperbranched or Dendritic Polymers or Copolymers

The hyperbranched or dendritic moieties are comprised of multi-functional monomers known to those skilled in the art and are described for example in U.S. Pat. Nos. 5,418,301 and 5,990,260 and U.S. application Ser. No. 09/778,194. An example are monomers containing one carboxyl group and two hydroxyl groups.

The hyperbranched or dendritic polymer or copolymer moieties of present compounds of formula (I) may be formed in situ during the preparation of a compound of formula (I), or may be prepared independently and reacted with a polymer additive compound of formula (a) to form a compound of formula (I), or a section of a hyperbranched or dendritic polymer or copolymer moiety may be prepared and used in a stepwise preparation of a compound of formula (I). Preferably, the stabilizers of formula (I) are prepared in a one-pot, one-step process.

The reactive functional group of the hyperbranched or dendritic polymer or copolymer or sections or individual components thereof are selected from the same group as the reactive functional groups of the polymer additives of formula (a), with the proviso that the reactive group of the additive is reactive with the reactive functional group of the hyperbranched or dendritic polymer or copolymer or sections or components thereof.

Of interest is a process which comprises reacting a carboxy-functional additive with poly(ethylene glycol)monomethyl ether and dimethylolpropionic acid.

Of special interest is a process which comprises reacting a carboxy-functional additive with poly(ethylene glycol) and dimethylolpropionic acid.

Preferred is a process for the preparation of a stabilizer of formula (I) in which the additive is a hydroxyphenylbenzotriazole.

Hyperbranched or dendritic polymers or copolymers are known in the art, and are disclosed for example in U.S. Pat.

Nos. 5,418,301, 5,990,260 and U.S. application Ser. No. 09/778,194, filed Feb. 7, 2001, the disclosures of which are incorporated herein by reference. The hyperbranched or dendritic moieties of the compound of formula (I) of the present invention may comprise complete compounds as described in U.S. Pat. Nos. 5,418,301, 5,990,260 and U.S. application Ser. No. 09/778,194, or they may comprise only the hyperbranched portions thereof. For example, a hyperbranched moiety of present formula (I) may simply be a polyester formed from dimethylolpropionic acid or other multi-functional monomer suitable for formation of a hyperbranched or dendritic polymer.

For example, the disclosure of U.S. Pat. No. 5,418,301 describes a dendritic macromolecule prepared from a central initiator molecule with at least one reactive hydroxyl group, a hyperbranched section attached to the initiator molecule, and optional chain stoppers. According to the present invention, compounds of the formula (a) may be employed as either monomeric chain extenders having two reactive groups, chain stoppers and/or as initiator molecules according to U.S. Pat. No. 5,418,301. Present compounds of formula (a) may also be bound to finished macromolecules as disclosed in this reference.

The hyperbranched copolymers of U.S. application Ser. No. 09/778,194 are amphiphilic and designed for surface activity when employed as polymer additives. The copolymers are described as (A)(B) or (B)(A)(B) copolymers where (A) is a linear hydrophilic polymer or oligomer and (B) is a random hyperbranched polymer or oligomer; which copolymers are fully or partially terminated with lipophilic groups. According to the present invention, polymer additive compounds of present formula (a) may also be bound to or incorporated into the hyperbranched copolymers of this reference.

Compounds of Formula (I) of the Present Invention

For example, a present reactive additive compound of formula (a), such as a hydroxyphenylbenzotriazole of formula 9), may act as the initiator, and/or a reactive additive compound such as a hydroxyphenylbenzotriazole of formula 6), 7) or 8) may act as the chain stopper according to U.S. Pat. No. 5,418,301. If the hyperbranched section is prepared from dimethylolpropionic acid, the following compounds of present formula (I) may be prepared:

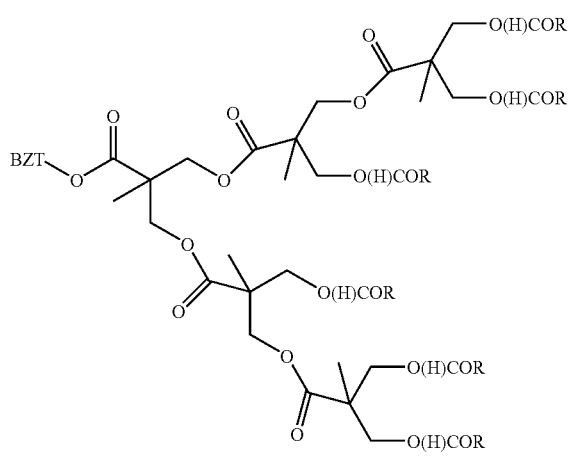

-continued

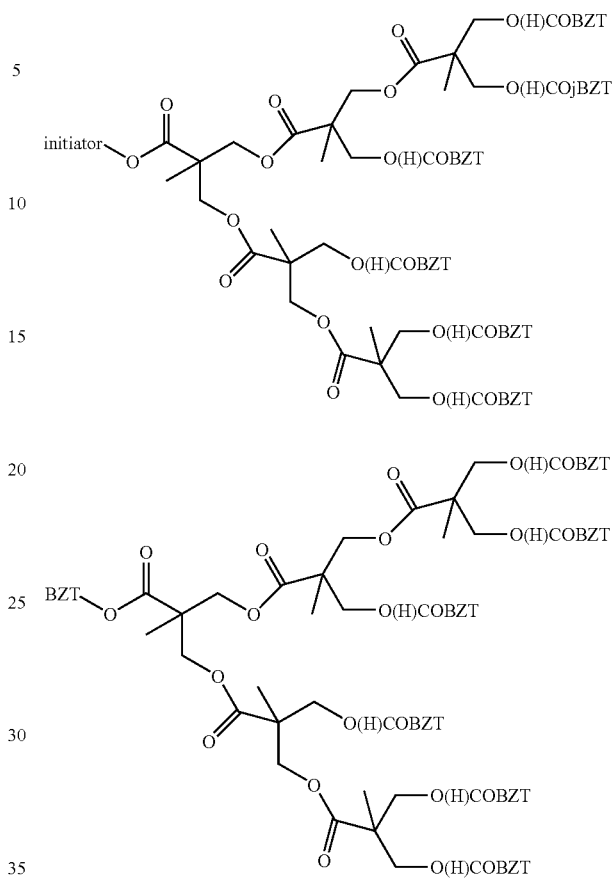

The designation BZT is the corresponding hydroxyphenylbenzotriazole moiety. The hydroxyphenylbenzotriazole moiety is attached to the hyperbranched polymer through a propanol or propanoyl group. The linking group L formed then is —$CH_2CH_2CH_2OCO$— or —$CH_2CH_2COO$— respectively (linking group between the hydroxyphenylbenzotriazole chromophore and the hyperbranched moiety).

The group "initiator" is a suitable initiator as described in U.S. Pat. No. 5,418,301, for example ditrimethylolpropane or ethoxylated pentaerythritol. The group "R" is a suitable chain stopper according to this reference, for example a long-chain alkyl such as lauryl.

It is contemplated that such compounds of formula (I) may have a mixture of additive moieties and chain stopper groups R. It is contemplated that compounds of formula (I) may have a mixture of different additive moieties, such as hindered amines and UVA's.

In the present invention, the hyperbranched copolymers of U.S. application Ser. No. 09/778,194 may be fully or partially terminated with present polymer additives of formula (a), or may have an additive moiety attached to the hydrophilic polymer. For example, where the hydrophilic polymer is polyethylene glycol (PEG) or poly(ethylene glycol) monomethyl ether (MPEG), the hyperbranching monomer is dimethylolpropionic acid, and present polymer additives of formulae 6)-8) are employed, the following structures may be obtained:

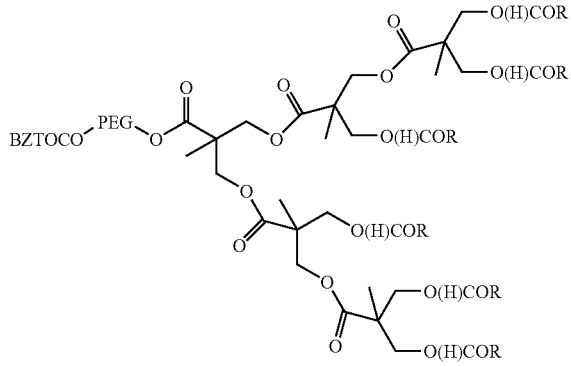
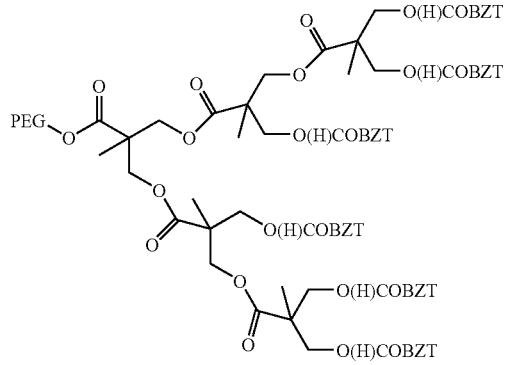
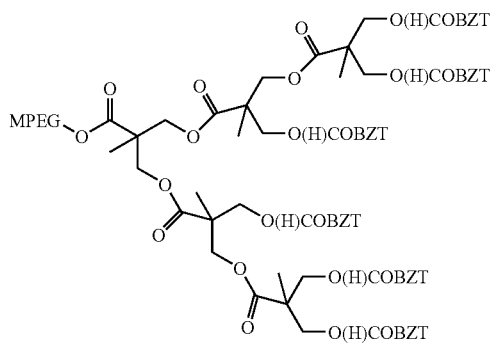
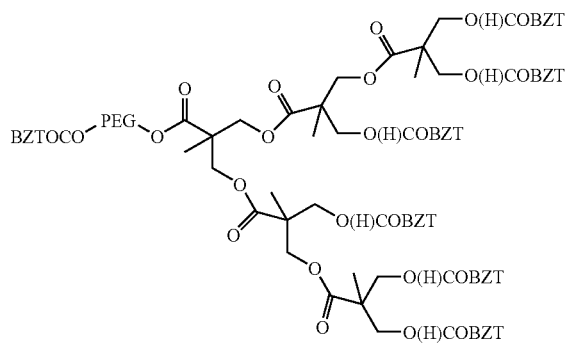
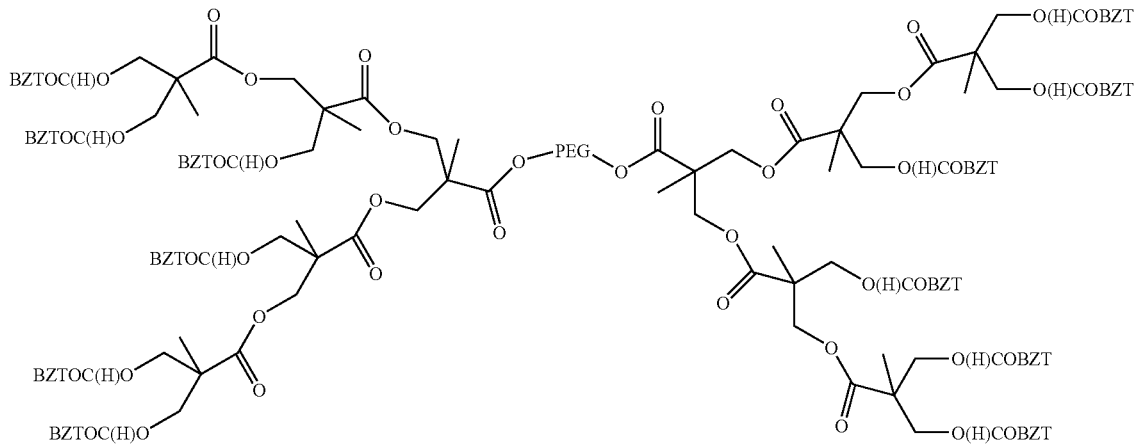

Again, the designation BZT is the corresponding hydroxyphenylbenzotriazole moiety. The hydroxyphenylbenzotriazole moiety is attached to the hyperbranched polymer through a propanol or propanoyl group. The linking group L formed then is —CH$_2$CH$_2$CH$_2$OCO— or —CH$_2$CH$_2$COO—. In the structure directly above, of present formula (I), the two hyper-branched sections attached through a PEG group together is the hyperbranched or dendritic polymer or copolymer moiety.

In any of the above specific formulae, other additive moieties such as the herein described hindered phenolic, hindered amine, hydroxyphenyltriazine, hydroxybenzophenone, hydroxylamine, nitrone, amine oxide, benzofuranone, phosphite or phosphonite moieties, may replace the hydroxyphenylbenzotriazole moieties. It is contemplated that the hyperbranched or dendritic compounds of formula (I) of the present invention may comprise more than one type of additive moiety.

For example a present compound of formula (I) may have a mixture of hindered amine (HALS) and ultraviolet light absorbing (UVA) moieties, such as described below:

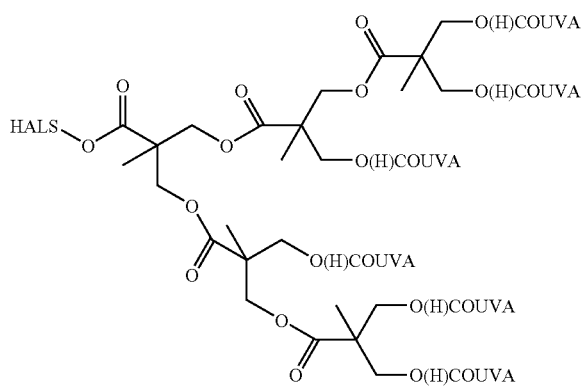

The UVA moieties may be selected from, for example, hydroxyphenylbenzotriazole, hydroxyphenyltriazine and hydroxyphenylbenzophenone moieties.

It is also contemplated that the polymer additive moieties of the present invention may be incorporated into hyperbranched or dendritic polymers or copolymers that are otherwise composed of only multifunctional monomers that make up the hyperbranched structure; that is with no other initiator or terminating (chain stopper) group. For example, an additive moiety attached to a hyperbranched polyester polymer.

It is also contemplated that a polymer additive of formula (a) may itself be a suitable multi-functional monomer for incorporation as part of a hyperbranching structure.

It is also contemplated that a polymer additive of formula (a) may itself be a suitable multi-functional monomer used to prepare a hyperbranching structure or to be part of a hyperbranching structure.

An example of a compound of formula (a) that is itself a multi-functional monomer for use as part of a hyperbranching structure or for use to prepare a hyperbranching structure is:

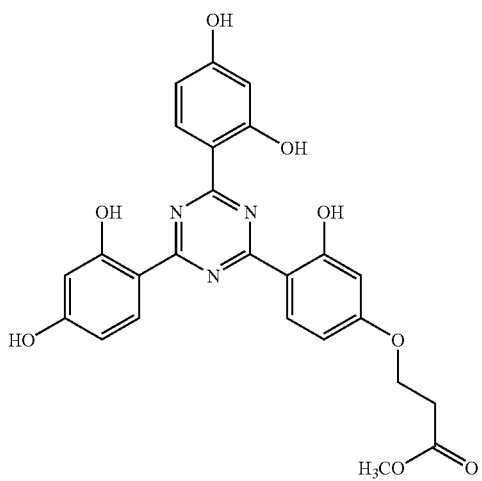

It is contemplated that an additive of formula (a) may be bound to a dendritic macromolecule and/or may be an initiator molecule and/or may be a monomeric chain extender and/or may be a chain stopper in the dendritic macromolecules disclosed in U.S. Pat. No. 5,418,301.

It is contemplated than an additive of formula (a) may be bound to the amphiphilic block copolymers and/or may be employed in place of the lipophilic terminating groups and/or may be employed in place of the linear hydrophilic polymer or oligomer component and/or may perform as a multi-functional monomer of the hyperbranched polymers as described in U.S. application Ser. No. 09/778,194.

It is contemplated that different additives of formula (a) of the same class (e.g. hydroxyphenylbenzotriazoles) or of different classes (e.g. UVA's and HALS) may be bound to the same hyperbranched moiety.

It is contemplated that additives with more than one reactive functional group may act as both a chain stopper and an initiator as per U.S. Pat. No. 5,418,301.

It is contemplated that in place of the hyperbranched or dendritic polymer or copolymer moieties of the present invention, that in their place true dendrimers may be used. True dendrimers are typically monodisperse and are prepared in a multi-step approach with purifications at each stage. True dendrimers are disclosed for example in U.S. Pat. No. 5,041,516, which discloses a stepwise "convergent" process for the preparation of polyaromatic ether and polyamide dendrimers. The disclosure of U.S. Pat. No. 5,041,516 is hereby incorporated by reference.

The disclosures of U.S. Pat. Nos. 3,669,939, 5,136,014, 5,041,516, 5,663,247 and 5,990,260 are also hereby incorporated by reference. The present additives of formula (I) may be comprised of hyperbranched or dendritic polymer or copolymer moieties as disclosed in these references.

Process

It can be seen that an additive of formula (a) may be reacted onto a finished hyperbranched or dendritic polymer or copolymer according to U.S. Pat. No. 5,418,301 or U.S. application Ser. No. 09/778,194, or may be reacted onto a partially finished hyperbranched or dendritic polymer or copolymer according to these references, or may be reacted onto a specific component prior to building up the hyperbranched or dendritic polymer or copolymer.

These processes are also a subject of the present invention.

Particularly, a one pot, one step process where all ingredients are reacted together at one time provide effective conditions for the preparation of the present compounds of formula (I).

For example, a one pot reaction of an additive compound of formula (a), a di-functional hydrophilic polymer or oligomer, a multi-functional monomer and a lipophilic terminating group will result in a hyperbranched copolymer of formula (I).

A one pot reaction of an additive compound of formula (a), a multi-functional monomer and a lipophilic terminating group will result in a hyperbranched polymer of formula (I).

A one pot reaction of an additive compound of formula (a) and a multi-functional monomer will result in a hyperbranched polymer of formula (I).

The present additive moieties of the compounds of formula (I) are "derived" from the compounds of formula (a).

Compounds of Formula (II) of the Present Invention

Also disclosed are permanent and/or surface active amphiphilic polymer stabilizers comprised of at least one polymer additive moiety and at least one amphiphilic copolymer moiety.

The amphiphilic copolymers are diblock copolymers that contain both a hydrophilic and a hydrophobic section.

Diblock amphiphilic copolymers are for example poly (alkylene oxide) adducts of long chain alcohols or poly(alkylene oxide adducts) of fatty acid esters. Poly(alkylene oxide) is for example poly(ethylene oxide), poly(propylene oxide), poly(ethylene glycol) or poly(propylene glycol).

A diblock amphiphilic copolymer is for example CH$_3$CH$_2$(CH$_2$CH$_2$)$_a$CH$_2$CH$_2$(OCH$_2$CH$_2$)$_b$OH, where a is 9 to 25 and b is 1 to 10.

Some diblock amphiphilic copolymers are commercially available, for example Atmer® 502, a 2 mole ethoxylated stearyl alcohol, C$_{18}$H$_{37}$(OCH$_2$CH$_2$)$_2$OH. Atmer® is a trademark of Uniqema. Also commercially available are the Unithox® ethoxylated alcohols, for example Unithox® 420, CH$_3$CH$_2$(CH$_2$CH$_2$)$_{13}$CH$_2$CH$_2$(OCH$_2$CH$_2$)$_{2.5}$OH. Unithox® is a trademark of Petrolite Corp.

The present compounds of the formula (II) may be prepared from above compounds such as Atmer® 502 or Unithox® 420 and a polymer additive compound of present formula (a) that has an electrophilic reactive group suitable for reacting with an alcohol. For example the condensation reaction of Unithox® 420 and the benzotriazole of formula 8) will form:

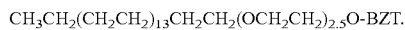

CH$_3$CH$_2$(CH$_2$CH$_2$)$_{13}$CH$_2$CH$_2$(OCH$_2$CH$_2$)$_{2.5}$O-BZT.

The group BZT is the hydroxyphenylbenzotriazole moiety, and in this case the linking group L is the group —OCOCH$_2$CH$_2$—. The diblock amphiphilic moiety is CH$_3$CH$_2$(CH$_2$CH$_2$)$_{13}$CH$_2$CH$_2$(OCH$_2$CH$_2$)$_{2.5}$—.

In the above specific formula, other additive moieties such as the herein described hindered phenolic, hindered amine, hydroxyphenyltriazine, hydroxybenzophenone, hydroxylamine, nitrone, amine oxide, benzofuranone, phosphite or phosphonite moieties, may replace the hydroxyphenylbenzotriazole moiety.

Stabilized Compositions

Another subject of the present invention are stabilized polymeric compositions comprising the present compounds of formula (I) or (II).

Accordingly, a subject of the present invention are stabilized compositions comprising (i) an organic material subject to the deleterious effects of heat, light or oxidation, and (ii) an effective stabilizing amount of a compound of formula (I) or (II).

The stabilized compositions of the present invention comprise the present compounds of formula (I) or (II) from 0.1 to 20 percent by weight, based on the weight of component (i). For example, component (i) may be present from 0.5 to 5 percent by weight, based on the weight of component (ii).

It is contemplated however, that in the stabilized compositions of the present invention, that the compounds of formula (I) may be employed at levels above 20 percent by weight; for example the compounds of formula (I) may themselves act as resins in a stabilized composition. That is, it is contemplated that present compounds of formula (I) themselves may form a stabilized resin composition, for example a stabilized polyester resin.

A portion of the additives of component (ii) may migrate to the surface of the organic substrate thereby modifying the surface properties thereof. Having light stabilizers, for example UVA's or HALS, primarily located on the surface of an article to be stabilized is especially advantageous. The additives of component (ii) may also be highly persistent in the organic substrate. The stabilizers of formula (I) or (II) of the present invention exhibit excellent surface affinity or are highly persistent, or both.

In addition to advantageously positioning additive moieties on the surface of an organic article to be stabilized, the surface properties of the article may be modified with the present compounds of formula (I) or (II).

The organic materials of the present compositions are for example natural or synthetic polymers and copolymers and may be selected from 1.)-34.) below:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE) and medium density polyethylene (MDPE).

Polyolefins, i.e. the polymers of monoolefins exemplified in the preceding paragraph, preferably polyethylene and polypropylene, can be prepared by different, and especially by the following, methods:

a) radical polymerization (normally under high pressure and at elevated temperature).

b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/unsaturated ester, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, SAN, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bis-glycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and diols and/or from hydroxycarboxylic acids or the corresponding lactones, for example polyethylene terephthalate, polytrimethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS. Polyesters and polyester copolymers as defined in U.S. Pat. No. 5,807,932 (column 2, line 53), incorporated herein by reference.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, polyisocyanates or epoxy resins.

26. Crosslinked epoxy resins derived from polyepoxides, for example from bis glycidyl ethers or from cycloaliphatic diepoxides.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

31. Polysiloxanes such as the soft, hydrophilic polysiloxanes described, for example, in U.S. Pat. No. 4,259,467; and the hard polyorganosiloxanes described, for example, in U.S. Pat. No. 4,355,147.

32. Polyketimines in combination with unsaturated acrylic polyacetoacetate resins or with unsaturated acrylic resins. The unsaturated acrylic resins include the urethane acrylates, polyether acrylates, vinyl or acryl copolymers with pendant unsaturated groups and the acrylated melamines. The polyketimines are prepared from polyamines and ketones in the presence of an acid catalyst.

33. Radiation curable compositions containing ethylenically unsaturated monomers or oligomers and a polyunsaturated aliphatic oligomer.

34. Epoxymelamine resins such as light-stable epoxy resins crosslinked by an epoxy functional coetherified high solids melamine resin such as LSE-4103 (Monsanto).

Preferred organic materials are synthetic polymers, most preferably thermoplastic polymers. Especially preferred organic materials are polyolefins such as polypropylene or polyethylene.

The stabilized compositions of the present invention are effective as coatings, for example automotive coatings. They are effective as coatings over plastic. They are effective in coatings that are water-borne paints.

The organic material of the present compositions may also be a recording material.

The recording materials according to the invention are suitable for pressure-sensitive copying systems, photocopying systems using microcapsules, heat-sensitive copying systems, photographic materials and ink jet printing.

The recording materials according to the invention are distinguished by an unexpected improvement in quality, especially with regard to the fastness to light.

The recording materials according to the invention have the construction known for the particular use. They consist of a customary carrier, for example, paper or plastic film, which has been coated with one or more layers. Depending on the type of material, these layers contain the appropriate necessary components, in the case of photographic materials, for example, silver halide emulsions, dye couplers, dyes and the like. Material particularly suitable for ink jet printing has a layer particularly absorptive for ink on a customary carrier. Uncoated paper can also be employed for ink jet printing. In this case the paper acts at the same time as the carrier material and as the ink-absorbent layer. Suitable material for ink jet printing is, for example, described in U.S. Pat. No. 5,073,448, which is incorporated herein by reference.

The recording material can also be transparent as, for example, in the case of projection films.

The organic materials of the present compositions may also be ink jet inks.

In addition to component (ii), the stabilized compositions may comprise further traditional additives selected from, for example, 1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-di-methyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example $\alpha$-tocopherol, $\beta$-tocopherol, $\beta$-tocopherol, $\delta$-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha$,$\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methylphenyl)dicyclopentadiene, bis[2-(3'tert-butyl-2-hydroxy-5-methylbenzyl)-6-tert-butyl-4-methylphenyl] terephthalate, 1,1-bis-(3,5-dimethyl-2-hydroxyphenyl)

butane, 2,2-bis-(3,5-di-tert-butyl-4-hydroxyphenyl) propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris (3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl) amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl)p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in GB-A-2301106 as component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on pages 68 to 73 of said GB-A-2301106.

The sterically hindered amine may also be one of the compounds described in EP 782994, for example compounds as described in claims 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethyl-piperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl)glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, WO 96/28431, EP 434608, EP 941989, GB 2,317,893, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,942,626; 5,959,008; 5,998,116 and 6,013,704, and U.S. application Ser. No. 09/383,163, for example 4,6-bis-(2,4-dimethylphenyl)-2-(2-hydroxy-4-octyloxyphenyl)-s-triazine, Cyasorb® 1164, Cytec Corp., 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)-phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonyliso-propylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxy-propyloxy)phenyl]-s-triazine, 2,4,6-tris[2-hydroxy-4-(3-sec-butyloxy-2-hydroxypropyloxy)-phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl)methyl phosphite, bis(2,4-di-tert-butyl-6-methylphenyl)ethyl phosphite, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite.

Especially preferred are the following phosphites:

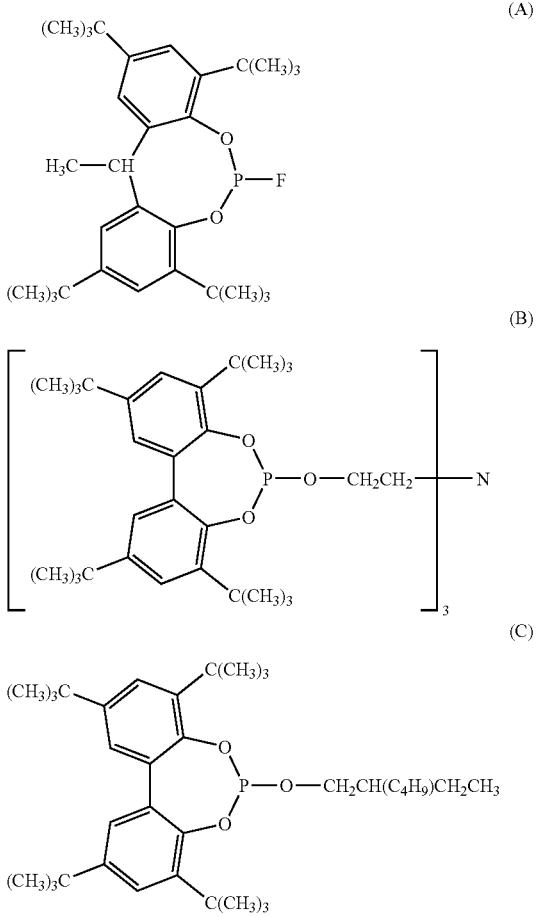

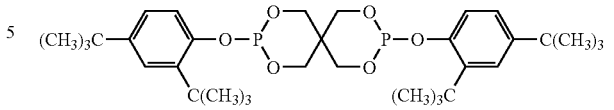

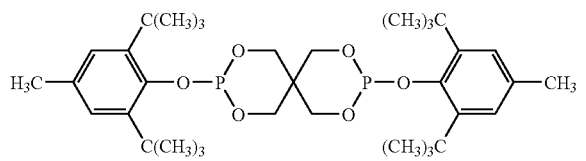

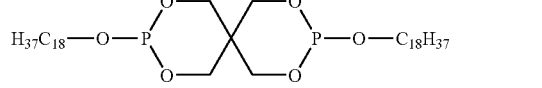

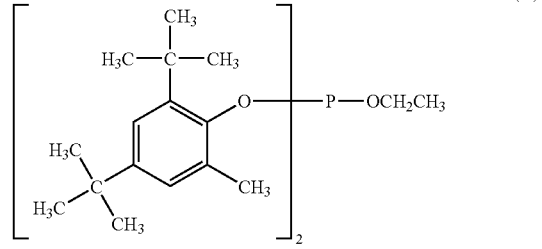

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N-methyl-N-octadecylhydroxylamine and the N,N-dialkylhydroxylamine derived from hydrogenated tallow amine.

6. Nitrones, for example N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863, 4,338,244, 5,175,312, 5,216,052, 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(3,4-dimethylphenyl)-5,7-di-tert-butylbenzofuran-2-one, Irganox® HP-136, Ciba Specialty Chemicals Corp., and 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

15. Dispersing Agents, such as polyethylene oxide waxes or mineral oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600-59-4), and blowing agents.

The additive functional parts of the above traditional additives are suitable additive moieties of compounds of formula (I) or (II) according to the present invention.

The present stabilizers of formula (I) or (II) of this invention and optional further additives may be applied to or incorporated in the polymeric substrate by any known methods, e.g. by melt blending, solution blending, solution casting and adsorption from solution.

For example, component (ii) and optional further additives may be incorporated in the polymeric substrate before or after molding or also by applying the dissolved or dispersed additive mixture to the polymeric substrate, with or without subsequent evaporation of the solvent. Component (ii) and optional further additives can also be added to the polymeric substrate in the form of a masterbatch which contains these components in a concentration of, for example, about 2.5% to about 25% by weight.

For example, component (ii), optional further additives and the polymeric substrate may all be dissolved in a mutually compatible solvent wherein the concentration of polymer in the solvent ranges from about 5 to about 50% by weight of the solvent. The solution may then be dried at an appropriate temperature to produce a cast film containing a blend of polymer and the additive(s).

Alternatively, additive compounds of component (ii) and optional further additives are blended into a polymeric substrate by dissolving the additive(s) in a volatile solvent to provide a solution with an additive concentration of about 5 to about 50% by weight. The solution is then mixed with the polymer and the mixture is dried thereby providing polymer particles which are substantially evenly coated with additive(s). The coated polymer particles may then be fed to an extruder wherein the mixture is melt blended and extruded to produce an extrudate containing the polymeric substrate and additive(s).

If in a liquid form, the stabilizers of component (ii) may be applied directly to polymer particles by stirring the polymer particles in the liquid additive mixture until the additive mixture is evenly dispersed on the surface of the polymer particles. The polymer may then be fed to an extruder to produce an extrudate of polymer substrate containing the additives.

The compositions of this invention may also be prepared by submitting the stabilizers of component (ii), optional further additives and solid polymeric material to an extruder followed by melt blending and extruding the molten mixture. Alternatively, the polymeric material and additives may be melt blended in a thermostatted vessel where the components are in molten form, followed by cooling of the mixture.

Component (ii) and optional further additives can also be added before or during the polymerization or before crosslinking.

Component (ii) and optional further additives can be incorporated into the polymeric substrate in pure form or encapsulated in waxes, oils or polymers.

Component (ii) and optional further additives can also be sprayed or coated onto the polymeric substrate. It may be used to dilute other additives (for example the conventional additives indicated above) or their melts so that it can be sprayed or coated together with these additives onto the polymeric substrate. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply component (ii) optionally together with other additives, by spraying.

Preferably, component (ii) and optional further additives are incorporated into the polymeric substrate of component (i) by melt blending.

The polymeric compositions of this invention, which have modified surface properties, may exhibit improved properties in the areas of, for example, anti-fog, dissipation of static electricity, paintability, dyeability, printability, wicking of moisture, adhesion, compatibility with immiscible polymers, biocompatibility and biodegradability.

The polymeric articles or constructions, which comprise components (i) and (ii), and which benefit from the application or incorporation of the compounds of formula (I) or (II) of this invention include carpet fibers, composite fibers, agricultural films, nonwoven coverstock, exterior automotive bumper fascia, packaging, hygienic products, membranes such as semipermeable, dialysis and reverse osmosis membranes, incompatible polymer blends, laminated articles and eyewear.

Preferred articles which comprise components (i) and (ii) are agricultural or packaging films, exterior automotive parts, nonwoven fabrics or filtration medium, semipermeable membranes, implantable medical devices or textile fibers.

The present compounds of formula (I) or (II) may also act as polymer compatiblizers. That is, they may help to form compatible blends of inherently incompatible polymers. It is also contemplated that the compounds of formula (I) or (II) may be employed to "place" additive functional moieties in specific locations in polymer blends (in one polymer only, not homogeneously throughout the blend). The polymer blends that may be compatibilized with the incorporation of the compounds of formula (I) or (II) of this invention include blends of polystyrene with polyesters, polystyrene with polyamides, polyolefins with polyesters and polyolefins with polyamides.

The compounds of formula (I) or (II) of this invention may also be effective as rheology modifiers and dispersants for pigments and fillers. Articles that would benefit include solvent and water borne paints.

The additives of this invention are advantageously employed in ink jet media and ink jet ink, for example as disclosed in EP 1120279 and EP 1031431 and U.S. Pat. Nos. 5,855,655, 5,782,963, 5,165,973, 5,215,577 and 5,670,249, the relevant disclosures of which are hereby incorporated by reference.

Anti-fog properties are important in greenhouse applications. A greenhouse is required to be closed during cold periods to contain heat to maintain a growing environment. With high humidity inside the greenhouse, this creates a situation where water condenses on the inside of greenhouse roof or cover when the temperature of the roof or cover is reduced to the dew point or lower. A greenhouse film made from an olefinic polymer is hydrophobic and has low surface tension, which causes condensed water to coalesce into droplets. This unwanted condition, where water condensate forms on the surface of the film as free droplets, is known as "fogging." Fogging prevents the transmission of sunlight and may fall onto and damage the crop below. Compositions of the present invention have superior anti-fog properties. Anti-fogging properties are also important in food overwrap (meat, vegetables, etc.) or other applications where a clear film with wettability or non-fogging is needed.

Hyperbranched polymers known in the art for example as described in U.S. Pat. No. 5,418,301 and U.S. application Ser. No. 09/778,194, without any additive functional moieties, are also useful in the compositions of this invention. That is to say, the co-use of compounds of present formula (I) or (II) with known hyperbranched or dendritic polymers or copolymers. The co-use of known amphiphilic copolymer additives without any additive functional moieties, such as herein described, is also contemplated.

The invention also relates to a process for stabilizing an organic material against the deleterious effect of heat, light or oxidation, which comprises incorporating therein or applying thereto at least one permanent or surface-active hyperbranched or dendritic stabilizer or permanent or surface active amphiphilic polymer stabilizer.

The following Examples illustrate the invention in more detail. They are not to be construed as limiting the instant invention in any manner whatsoever. The invention is declared to cover all changes and modifications of the specific examples which do not constitute departure from the spirit and scope of the invention.

EXAMPLE 1

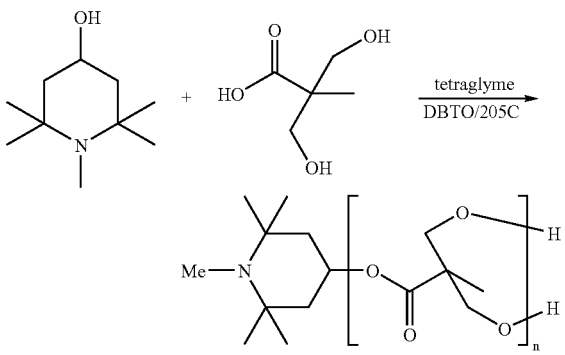

1,2,2,6,6-Pentamethyl-piperidin-4-ol (25.5 g, 0.15 mol), 2,2-bis(hydroxymethyl)propionic acid (40.2 g, 0.30 mol), dibutyltin oxide (0.40 g, 0.0015 mol), and tetraglyme (60.5 g, 0.27 mol) are added to a reaction flask equipped with a Dean Stark trap. The reaction mixture is heated to 205° C. and held at this temperature for 4 hours. The reaction mass is cooled down and a copious amount of heptane is added to remove a majority of the polymerization solvent. The resins is dissolved in a mixture of 300 g of methanol and 400 g of toluene. The methanol is distilled off under vacuum and toluene and tetraglyme are decanted off. The resin is extracted twice with 400 g of hot toluene (80° C.) with decantation of the toluene. The resin is dried under vacuum to constant weight. The title compound is received (60.4 g) as a light yellow resinous solid having a molecular weight of 1240 as determined by Gel Permeation Chromatography (GPC).

EXAMPLE 2

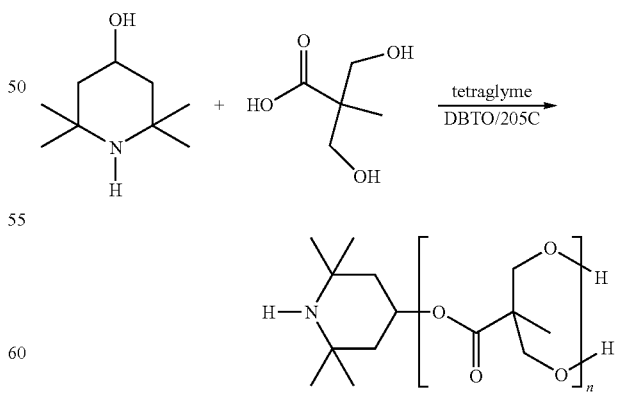

Following the conditions of Example 1, 2,2,6,6-tetramethyl-piperidin-4-ol (47.1 g, 0.30 mol), 2,2-bis(hydroxymethyl)propionic acid (80.5 g, 0.60 mol), dibutyltin oxide (2.27 g, 0.009 mol), and tetraglyme (100.9 g, 0.45 mol) are added to a reaction flask. The title compound is obtained (115 g) as an off-white resinous solid having a molecular weight of 2066 as determined by GPC.

EXAMPLE 3

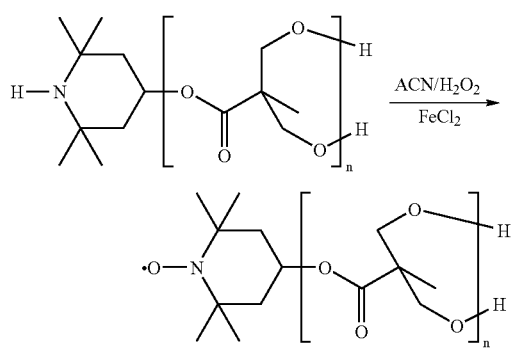

The resin obtained in Example 2 (5 g, 0.0012 mole based on amine), acetonitrile (50 g, 1.21 mole) and ferrous chloride (0.4 g, 0.002 mol) are added to a reaction flask. To this stirred solution, hydrogen peroxide (3.2 g, 0.047 mole) is added drop wise over two hours. This solution is stirred overnight at ambient temperature after which the solvent is distilled under vacuum. The solid is dried under vacuum to constant weight. The title compound is obtained (5 g) as a light orange resinous solid having a molecular weight of 1096 as determined by GPC.

EXAMPLE 4

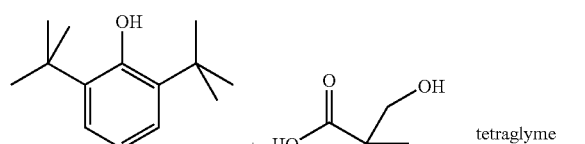

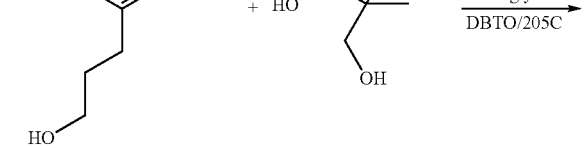

Following the conditions of Example 1, 2,6-di-tert-butyl-4-(3-hydroxypropyl)-phenol (43.5 g, 0.165 mol), 2,2-bis(hydroxymethyl)propionic acid (44.2 g, 0.33 mol), dibutyltin oxide (1.23 g, 0.005 mol), and tetraglyme (100.9 g, 0.45 mol) are added to a reaction flask. The title compound is obtained (75 g) as an off-white viscous liquid having a molecular weight of 1467 as determined by GPC.

EXAMPLE 5

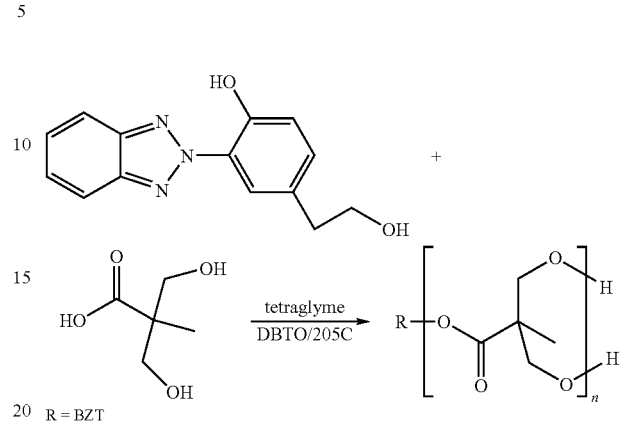

R = BZT

Following the conditions of Example 1,2-benzotriazol-2-yl-4-(2-hydroxyethyl)-phenol (BZT, 10 g, 0.039 mol), 2,2-bis(hydroxymethyl)propionic acid (10.5 g, 0.078 mol), dibutyltin oxide (0.40 g, 0.0016 mol), and tetraglyme (21 g, 0.093 mol) are added to a reaction flask. The title compound is obtained (6.1 g) as a light-yellow resinous solid having a molecular weight of 1496 as determined by GPC.

COMPARATIVE EXAMPLE 1

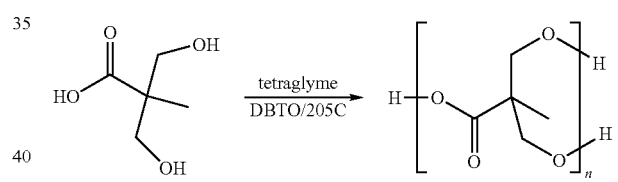

Following the conditions of Example 1, 2,2-bis(hydroxymethyl)propionic acid (120.7 g, 0.90 mol), dibutyltin oxide (2.50 g, 0.01 mol), and tetraglyme (100.9 g, 0.45 mol) are added to a reaction flask. The title compound is obtained (110 g) as a white resinous solid having a molecular weight of 3254 as determined by GPC.

EXAMPLE 6

Ink Jet Media

A resin-coated paper impregnated with inorganic adsorbent particles (Konica QP Photoglossy ink jet paper, Konica Corp.) is purchased. On the ink-receiving layer, a 0.8 wt % methanol solution of each of the compounds obtained in Examples 1-5 and Comparative Example 1 is applied in an amount to achieve 650-700 mg/m$^2$. The paper is allowed to dry under ambient temperature and pressure for 24 hours.

EXAMPLE 7

Ink Jet Media

A resin-coated paper impregnated with inorganic adsorbent particles (Konica QP Photoglossy ink jet paper, Konica Corp.) is purchased. On the ink-receiving layer, 0.8 wt % methanol solution of each of the compounds obtained in Examples 1-5 and Comparative Example 1 is applied in an amount to achieve 1300-1400 mg/m². The paper is allowed to dry under ambient temperature and pressure for 24 hours.

EXAMPLE 8

Ink

The compounds of Examples 4 and 5 are added to an ink composition, for example as disclosed in U.S. Pat. No. 5,855,655 or 5,782,963, at a concentration of 2 wt % and 0.5 wt % respectively. The images printed from these stabilized inks show reduced dye fading and better image permanence.

EXAMPLE 9

Ink Jet Media

A commercial white polyethylene terephthalate sheet is coated with silica and polyvinylalcohol according to EP 1031431 A2 Example 1. A methanol solution of the compound of Example 1 is applied to this sheet in an amount equivalent to 400 mg/m². The image printed on this receiving layer shows reduced dye fading and better image permanence.

EXAMPLE 10

A commercial white polyethylene terephthalate sheet is coated with alumina hydrate and polyvinylalcohol according to EP 1031431 A2 Example 5. A methanol solution of the compound of Example 2 is applied to this sheet in an amount equivalent to 400 mg/m². The image printed on this receiving layer shows reduced dye fading and better image permanence.

EXAMPLE 11

A paper sheet containing alumina is prepared according to EP1031431 A2 Example 8. A methanol solution of the compound of Example 3 is applied to this sheet in an amount equivalent to 600 mg/m2. The image printed on this receiving layer shows reduced dye fading and better image permanence.

EXAMPLE 12

A paper sheet containing silica is prepared according to U.S. Pat. No. 5,165,973. A methanol solution of the compound of Example 4 is applied to this sheet in an amount equivalent to 700 mg/m2. The image printed on this receiving layer shows reduced dye fading and better image permanence.

EXAMPLE 13

Separately, test patterns (cyan, magenta and yellow) are printed on the sheets prepared in Examples 6 and 7 using a Hewlett Packard DeskJet 970 Cxi printer. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

EXAMPLE 14

A mixture of dimethylolpropionic acid and a hydroxyphenylbenzotriazole of formula 8)

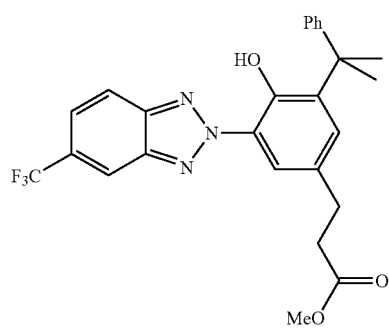

are reacted to form a hyperbranched polyester terminated with the benzotriazole moiety.

EXAMPLE 15

Example 14 is repeated, replacing the benzotriazole of formula 8) with the following additive compounds 1), 2), 4), 6), 7), 9), 10) and 11):

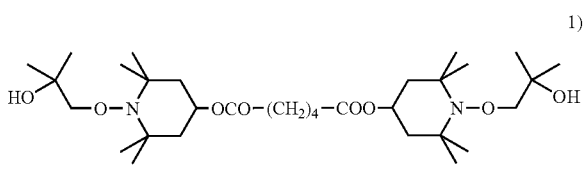

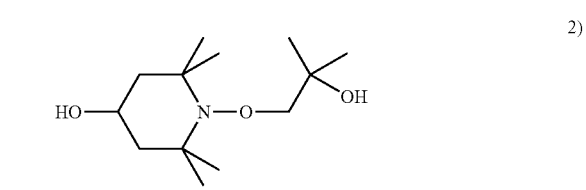

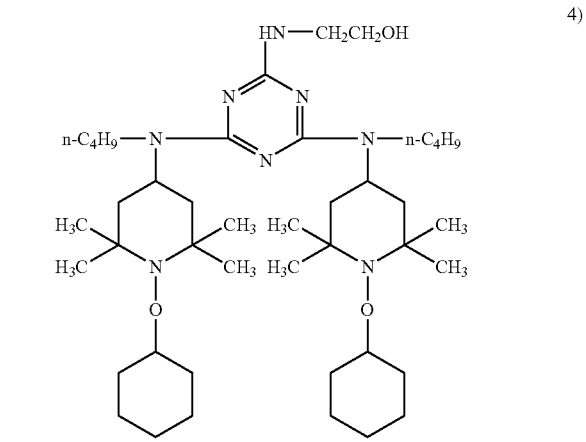

-continued

6)
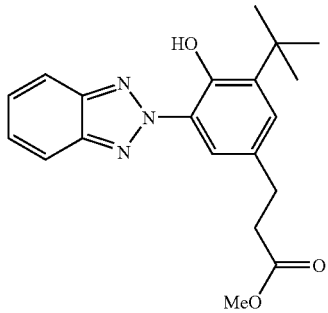

7)
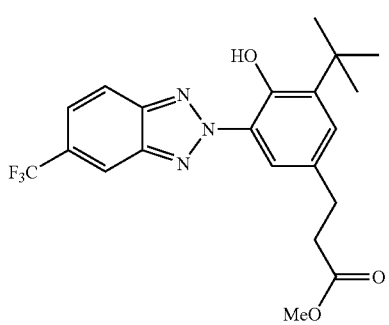

9)
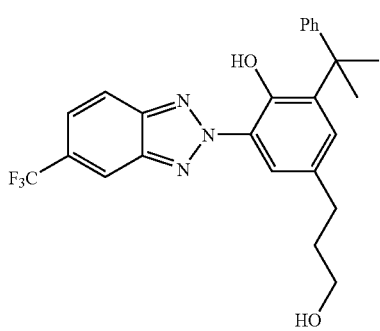

10)
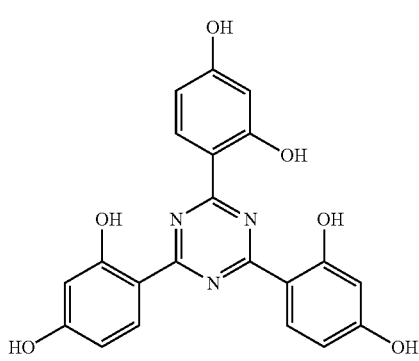

-continued

11)
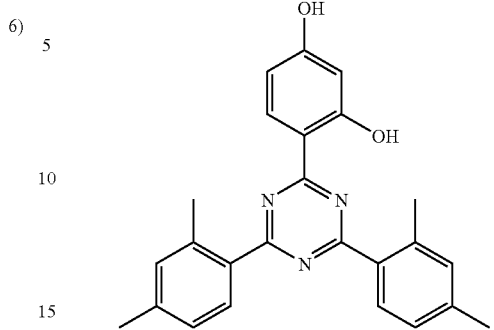

The compounds of formulae 1) and 2) act as an initiators from two different reactive sites as defined in U.S. Pat. No. 5,418,301. The compounds of formulae 4), 9), 10) and 11) act as initiators. The compounds of formulae 6) and 7) act as chain stoppers. The additive moieties are bound to the hyperbranched polyester.

EXAMPLE 16

Example 14 is repeated, replacing the compound of formula 8) with a mixture of compounds of formula 8) and the formula:

12)
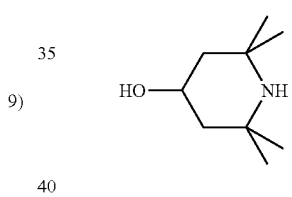

The compound of formula 8) is a chain stopper and the compound of formula 12) is an initiator as defined in U.S. Pat. No. 5,418,301 in the formed hyperbranched polyester.

EXAMPLE 17

Examples 14-16 are repeated, with an additional lipophilic component selected from stearic acid, isostearic acid, myristic acid and behenic acid being added. These lipophilic components additionally are part of the hyperbranched polyester as lipophilic terminating groups as defined in U.S. application Ser. No. 09/778,194 (or chain stoppers as defined in U.S. Pat. No. 5,418,301).

EXAMPLE 18

Examples 14-17 are repeated, with an additional hydrophilic component selected from poly(ethylene glycol) (PEG) and poly(ethylene glycol) monomethyl ether (MPEG). These hydrophilic components additionally are part of the hyperbranched polyester as defined in U.S. application Ser. No. 09/778,194. When using PEG, the additives employed are of formula 6), 7) and/or 8).

EXAMPLE 19

Atmer® 502 is reacted with a benzotriazole of formula 8) to form the product:

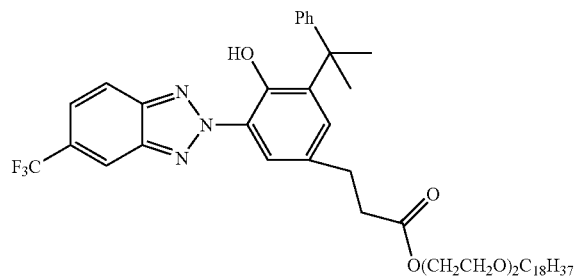

EXAMPLE 20

Example 19 is repeated, replacing Atmer® 502 with Unithox® 420.

EXAMPLE 21

Examples 19 and 20 are repeated, replacing the benzotriazole of formula 8) with benzotriazoles of formulae 6) and 7).

EXAMPLE 22

Contact Angle Measurements in Compression Molded LDPE Plaques

Compression molded 10 mil plaques of copolymer additives of the preceding Examples in low density polyethylene (Dow Chemical LDPE 6401) are prepared as follows. The additives and substrate are initially blended by melt compounding in a twin-screw extruder. Plaques of the blends are made by compression molding against steel at 400° F.

Receding water contact angles of the compression molded plaques are measured using a Kruss K12 dynamic contact angle tensiometer. This method, often referred to as the Wilhelmy plat technique, measures the force of wetting of a solid by a liquid (usually water) as it is initially immersed and subsequently withdrawn. This wetting force is then translated into receding (withdrawn) contact angles. It is generally accepted by those skilled in the art that receding contact angles are a measure of a materials' hydrophilic character.

The receding angles of the plaques are measured immediately after compression molding. They are rubbed five times with a water moistened paper towel and the receding angle is measured again. The plaques are stored at 70° F. with a relative humidity of 30-40%. The receding angles of the plaques are monitored over the course of 30 days. Comparison of the receding angles before and after rubbing gives a qualitative measure of the immediate persistence and relative modifying strength of the additive, while the 30 day monitoring study provides insight as to the additive's relative long-term persistence. The smaller the value of the receding angle, the greater the surface energy of the LDPE plaque.

The additives of this invention are effective towards increasing the surface energy of polyethylene. The compounds of the instant invention increase the surface energy of LDPE to a greater degree than compounds representative of the state of the art and/or they are more persistent in the substrate. The plaques also exhibit excellent stability towards heat, moisture and light.

EXAMPLE 23

Contact Angle Measurements in LDPE Blown Films

When Example 22 is repeated in LDPE Blown Films, the compounds of the instant invention increase the surface energy of LDPE to a greater degree than compounds representative of the state of the art and/or they are more persistent in the substrate as measured by receding, static or advancing contact angles. The films also exhibit excellent stability to heat, moisture and light.

EXAMPLE 24

Polypropylene Fiber Dyeability

Fiber grade polypropylene, Montell PROFAX 6301, and the appropriate amount of a present additive of the preceding Examples are mixed on a TURBULA mixer for 15 minutes. The blended mix is added to a SUPERIOR MPM single screw lab extruder at 218, 232, 246 and 246° C., screw speed is 80 rpm. The molten polypropylene with additive exits a round die, is cooled in a water trough and is fed into a CONAIR JETRO pelletizer. The compounded pellets are fed into a HILLS LAB FIBER EXTRUDER with a 41 hole delta spinneret at 232, 246, 260 and 274° C. A constant pressure of 750 psi controls the screw speed via a feed back loop. The feed, draw, and relax rolls are at 80 and 100° C., and are rotating at 120, 400 and 383 meters per minute. The fiber comes in contact with a 6% aqueous fiber finish solution just before the feed roll. This solution is LUROL PP-4521 from Goulston lndstries. A LEESONA winder at the end of the line collects the fiber onto a spool. The final denier per filament is 15. The collected fiber is removed from the spool and is knitted into a sock with a LAWSON HEMPHILL FAK sampler knitter.

Solutions of dyes are prepared at 1.0 g/L in distilled water in separate containers. For disperse dyes this is done by heating water to 63-85° C., then adding water to the dye. The solutions of the acid dyes are made by heating water to 85-100° C. The solutions of the leveler, lubricant and pH control chemicals are made at room temperature at a 10% w/w level.

A ROACHES programmable dye bath is set to the following conditions:

Disperse dye for PP: Temperature rise of 3.5° C. per minute to 98° C. with a hold time of 60 minutes at 98° C. then a cool down at maximum cooling of 5.5° C. per minute.

Acid dye for PP: Temperature rise of 3.5° C. per minute to 98° C. with a hold time of 30 minutes at 98° C. then a cool down at maximum cooling of 5.5° C. per minute.

The appropriate amounts of the solutions (see Dye Solutions Table) are added to a steel 500 mL cylinder based on a 5.0 g weight of sock. The sock is identified with a laundry tag and is placed in the cylinder. The cylinder is filled with distilled water. The pH is checked and should be 4-5 for disperse dyeing and 6-6.5 for acid dyeing. Finally the cylinders are sealed and placed into the dye bath and the cycle is started. After the dye cycle is completed, the socks are removed from the cylinders and are rinsed with tap water. The excess water is removed from the socks via a centrifuge and are dried in a forced air oven at 100° C. for 15 minutes.

Lightness and darkness (L) of the socks are measured on a Datacolor Spectrophotometer SF600. L is a measure of light and dark on a scale of 0 (dark) to 100 (light). Instrument conditions are CIE lab, D65, 10 deg, SCl, SAV, UV400-700. A lower L value indicates improved dyeability.

| Dye Solutions | |
| --- | --- |
| Disperse Dye | % Weight on Fiber |
| Yellow K-GL | 0.5 |
| Red K-BB | 0.5 |
| Blue K-RB | 1.0 |
| UNIVADINE DIF | 2.0 |
| CIBAFLUID UA | 1.0 |
| Acetic Acid | 0.5 |

The formulations contain 5% by weight of the present additives based on the weight of polypropylene.

Formulations containing additives of the present invention impart improved dyeability to polypropylene socks compared to socks containing no additive. The socks also exhibit excellent stability to the effects of heat, moisture and light.

The crocking test method determines the degree of color which may be transferred from the surface of a dyed article to other surfaces by rubbing. Such dye transfer is undesirable. The test requires specific rubbing, via a crockmeter, with both a dry and a wet white test cloth across the dyed article. The cloths are then evaluated via the gray scale. The gray scale is a 5 unit scale (1-5 @ 0.5 divisions), with 5 representing negligible dye transfer.

To qualify as a successful additive to promote polypropylene (PP) dyeability, the sock containing the additive will dye to a dark shade as would be expected of a polyester (PET) control, there should be no or negligible dye transfer when being evaluated by the crocking test, and there should be no loss of physical properties.

The socks containing the amphiphilic block copolymers of the present invention show excellent dyeability as evidenced by low L values and acceptable wet and dry crock values.

EXAMPLE 25

Anti-Fog Properties of LDPE Blown Films

Additives of the preceding Examples are added to low density polyethylene having a melt index of 2.0 dg/min. and a density of 0.922 g/mL at 10% by weight, based on the weight of polymer, and the mixture is blended in a Brabender. The polymer melt temperature is 150° to 170° C. The polymer mixtures are pelletized to give a masterbatch. Granules of the masterbatch are tumble-blended with granules of low density polyethylene at the weight ratio of 1 to 9 (the resulting concentration of the anti-fogging agent in the low density polyethylene polymer is 10,000 ppm). A film with a thickness of about 75 micrometers is produced on a tubular blown film line at a melt temperature of about 210° C.

The anti-fogging test method tests the ability of the film surface to retain its anti-fogging property after exposure to moisture under cold (4° C.) and hot (60° C.) temperature conditions.

For the cold-fog test, 200 mL of water is put in a 250 mL beaker and the test film is placed on the beaker so as to cover the entire opening. The beaker is then placed in a temperature controlled cabinet at 4° C. Anti-fog evaluations are done in predetermined time intervals up to 7 days For the hot-fog test, 50 mL of water is put in a 250 mL beaker and the test film is placed on the beaker so as to cover the entire opening. The beaker is then placed in a bath containing water at 60° C. Anti-fog evaluations are done in predetermined time intervals up to 3 hours.

Anti-fogging ratings are as follows:

High fogging: 1

Moderate fogging: 2

Fogged in patches: 3

Few large drops: 4

Clear, no drops: 5

Polyethylene film containing the additives of the present invention have superior anti-fogging properties relative to films with no surfactant additive and with state-of-the-art additives such as Atmer® 103. The films also exhibit excellent stability to heat, moisture and light.

EXAMPLE 26

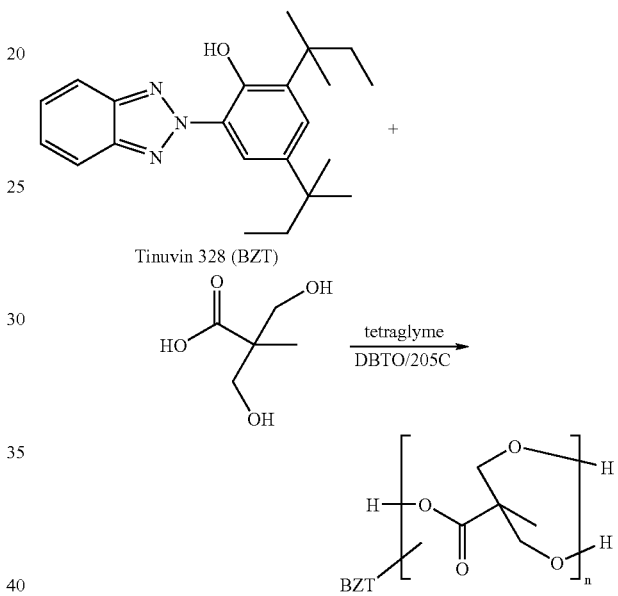

Following the conditions of Example 1, Tinuvin® 328 (70.3 g, 0.20 mol), 2,2-bis-(hydroxymethyl)propionic acid (53.7 g, 0.40 mol), dibutyltin oxide (1.50 g, 0.006 mol), and tetraglyme (100.9 g, 0.45 mol) are added to a reaction flask. The benzotriazole-functionalized hyperbranched polymer is obtained (115 g) as a light-yellow resinous solid having a molecular weight of 1332 as determined by GPC.

EXAMPLE 27

Solubility in Polar Media

The solubility of the compound of Example 26 versus Tinuvin® 328 is determined in methanol at ambient temperature. From the data below, compositions containing this type of hydrophilic dendrimer have improved solubility in polar media.

| Compound | Solubility in methanol (wt %) |
| --- | --- |
| Tinuvin ® 328 | 0.6 |
| Example 26 | 57 |

EXAMPLE 28

Color Change of Printed Articles

The change in color (ΔE) for the printed articles of Examples 6 & 13 is measured accordingly. The data below demonstrate that the instant compounds are useful in reducing dye fade when incorporated into recording media.

ΔE for Cyan at 100% print density after two weeks of fluorescent light exposure:

| Compound | ΔE |
|---|---|
| Blank (no additive) | 3.63 |
| Example 3 | 2.51 |
| Example 4 | 2.17 |
| Example 2 | 2.12 |
| Example 1 | 1.94 |

ΔE for Magenta at 100% print density after two weeks of fluorescent light exposure:

| Compound | ΔE |
|---|---|
| Blank (no additive) | 7.10 |
| Example 2 | 4.52 |
| Example 3 | 4.42 |
| Example 4 | 4.14 |

ΔE for Yellow at 100% print density after two weeks of fluorescent light exposure:

| Compound | ΔE |
|---|---|
| Blank (no additive) | 1.79 |
| Example 1 | 1.32 |

ΔE for Cyan at 50% print density after two weeks of fluorescent light exposure:

| Compound | ΔE |
|---|---|
| Blank (no additive) | 2.76 |
| Example 3 | 2.40 |
| Example 2 | 2.19 |
| Example 1 | 1.92 |

ΔE for Magenta at 50% print density after two weeks of fluorescent light exposure:

| Compound | ΔE |
|---|---|
| Blank (methanol only) | 6.94 |
| Comparative Example 1 | 5.73 |
| Example 4 | 4.44 |
| Example 3 | 4.37 |
| Example 2 | 4.05 |

ΔE for Yellow at 50% print density after two weeks of fluorescent light exposure:

| Compound | ΔE |
|---|---|
| Blank (no additive) | 3.02 |
| Example 3 | 2.46 |
| Example 2 | 2.38 |
| Example 1 | 2.14 |
| Example 4 | 1.95 |

ΔE for Cyan at 100% print density after two weeks in the dark:

| Compound | ΔE |
|---|---|
| Blank (no additive) | 2.35 |
| Example 1 | 1.73 |
| Example 2 | 1.33 |
| Example 3 | 1.05 |

EXAMPLE 29

Color Change of Printed Article

The change in color (ΔE) for the printed articles of Examples 7 & 13 is measured accordingly. The data below demonstrate that the instant compounds are useful in reducing dye fade when incorporated into recording media.

ΔE for Cyan at 100% print density after two weeks of fluorescent light exposure:

| Compound | ΔE |
|---|---|
| Blank (methanol only) | 3.31 |
| Example 4 | 2.82 |
| Example 3 | 2.02 |
| Example 25 | 1.72 |
| Example 2 | 1.42 |
| Example 1 | 1.14 |

ΔE for Yellow at 100% print density after two weeks of fluorescent light exposure:

| Compound | ΔE |
|---|---|
| Blank (methanol only) | 2.33 |
| Example 3 | 1.71 |
| Example 2 | 1.58 |
| Example 1 | 0.76 |
| Example 4 | 0.58 |

ΔE for Cyan at 50% print density after two weeks of fluorescent light exposure:

| Compound | ΔE |
|---|---|
| Blank (methanol only) | 2.65 |
| Example 3 | 1.39 |
| Example 2 | 1.33 |
| Example 1 | 1.04 |

ΔE for Magenta at 50% print density after two weeks of fluorescent light exposure:

| Compound | ΔE |
|---|---|
| Blank (no additive) | 7.50 |
| Example 4 | 3.75 |
| Example 1 | 2.63 |
| Example 2 | 2.44 |

ΔE for Yellow at 50% print density after two weeks of fluorescent light exposure:

| Compound | ΔE |
|---|---|
| Blank (methanol only) | 2.75 |
| Comparative Example 1 | 2.06 |
| Example 25 | 1.59 |
| Example 1 | 1.42 |
| Example 4 | 1.00 |

ΔE for Magenta at 100% print density after two weeks in the dark:

| Compound | ΔE |
|---|---|
| Blank (methanol only) | 1.20 |
| Example 1 | 0.79 |
| Example 2 | 0.62 |
| Example 3 | 0.42 |

ΔE of the blank article (no print) after two weeks of fluorescent light exposure:

| Compound | ΔE |
|---|---|
| Blank (no additive) | 0.95 |
| Example 1 | 0.21 |

EXAMPLE 30

Color Change of Printed Article

The change in color (ΔE) for the printed articles of Examples 6, 7, & 13 is measured accordingly. The data below demonstrate that the instant compounds are useful in reducing dye fade when incorporated into recording media.

ΔE for Magenta at 100% print density after two weeks of fluorescent light exposure:

| Compound | ΔE |
|---|---|
| Blank (methanol only) | 6.60 |
| Example 1 (650-700 mg additive/m$^2$) | 4.81 |
| Example 1 (1300-1400 mg additive/m$^2$) | 2.53 |

What is claimed is:

1. A process for the preparation of a compound of formula (I)

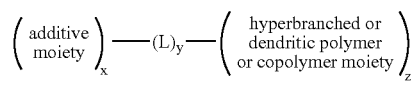

(I)

where additive moiety is selected from the group consisting of hindered phenolic antioxidant, hydroxyphenylbenzotriazole, hydroxyphenyltriazine, hydroxybenzophenone and hindered amine light stabilizer moieties, x and y are each independently greater than or equal to 1, z is 1 to 5, and L is independently of each other a direct bond or a chemical linking group, with the proviso that the self-condensation of 3,5-dihydroxybenzoic acid and 4-hydroxyphenylmethyl carbinol benzotriazole is excluded, which process comprises reacting a carboxy-functional additive compound with poly(ethylene glycol)monomethyl ether and dimethylolpropionic acid, where the carboxy-functional additive compound contains an additive moiety selected from the group consisting of hindered phenolic antioxidant, hydroxyphenylbenzotriazole, hydroxyphenyltriazine, hydroxybenzophenone and hindered amine light stabilizer moieties.

* * * * *